US012639935B2

(12) United States Patent
Xuan et al.

(10) Patent No.: US 12,639,935 B2
(45) Date of Patent: May 26, 2026

(54) VISUAL ANALYTICS FRAMEWORK FOR EXPLAINABLE DATA SLICING-BASED MODEL VALIDATION

(71) Applicant: Robert Bosch GmbH, Stuttgart (DE)

(72) Inventors: Xiwei Xuan, Davis, CA (US); Jorge Henrique Piazentin Ono, Sunnyvale, CA (US); Liang Gou, San Jose, CA (US); Liu Ren, Saratoga, CA (US)

(73) Assignee: Robert Bosch GmbH, Stuttgart (DE)

( * ) Notice: Subject to any disclaimer, the term of this patent is extended or adjusted under 35 U.S.C. 154(b) by 184 days.

(21) Appl. No.: 18/524,021

(22) Filed: Nov. 30, 2023

(65) Prior Publication Data

US 2025/0182457 A1     Jun. 5, 2025

(51) Int. Cl.
| | |
|---|---|
| *G06V 10/776* | (2022.01) |
| *G06T 11/20* | (2006.01) |
| *G06V 10/762* | (2022.01) |
| *G06V 10/77* | (2022.01) |
| *G06V 10/774* | (2022.01) |
| *G06V 10/82* | (2022.01) |
| *G06V 10/94* | (2022.01) |
| *G06V 20/70* | (2022.01) |

(52) U.S. Cl.
CPC .......... *G06V 10/776* (2022.01); *G06T 11/206* (2013.01); *G06V 10/762* (2022.01); *G06V 10/7715* (2022.01); *G06V 10/774* (2022.01); *G06V 10/82* (2022.01); *G06V 10/945* (2022.01); *G06V 20/70* (2022.01)

(58) Field of Classification Search
CPC .... G06V 10/776; G06V 20/70; G06V 10/762; G06V 10/7715; G06V 10/82; G06V 10/774; G06V 10/945; G06T 11/206
See application file for complete search history.

(56) References Cited

U.S. PATENT DOCUMENTS

| | | | |
|---|---|---|---|
| 2022/0121884 A1* | 4/2022 | Zadeh | G06N 3/006 |
| 2023/0334814 A1* | 10/2023 | Ranganathan | G06N 3/0895 |

OTHER PUBLICATIONS

Adebayo et al., "Sanity Checks for Saliency Maps", 32nd Conference on Neural Information Processing Systems, NeurIPS2018, Montréal, Canada.
Arrieta et al., "Explainable Artificial Intelligence (XAI): Concepts, taxonomies, opportunities and challenges toward responsible AI", Information Fusion, 2020, pp. 82-115, vol. 58, Elsevier.

(Continued)

*Primary Examiner* — David T Welch
*Assistant Examiner* — Ryan Allen Barham
(74) *Attorney, Agent, or Firm* — Maginot, Moore & Beck LLP

(57)     ABSTRACT
The workflow generally comprises three phases: an Explainable Data Slice-Finding phase, a Slice Summarization and Annotation phase, and a Slice Error Mitigation phase. In the Explainable Data Slice-Finding phase, the workflow employs pixel attributions to create interpretable features of the dataset. In the Slice Summarization and Annotation phase, the workflow transforms the generated features into visualizations including a 'Data Slice Mosaic.' Finally, in the Slice Error Mitigation phase, the workflow leverages the annotation and user-verified spuriousness to mitigate slice errors in the machine learning model.

18 Claims, 16 Drawing Sheets

(56) References Cited

OTHER PUBLICATIONS

Barash et al., "Bridging the Gap between ML Solutions and Their Business Requirements using Feature Interactions", 27th ACM Joint European Software Engineering Conference and Symposium on the Foundations of Software Engineering, 2019, pp. 1048-1058.

Barber et al., "The Quickhull Algorithm for Convex Hulls", ACM Transactions on Mathematical Software, Dec. 1996, pp. 469-483, vol. 22, No. 4.

Cabrera et al., "FairVis: Visual analytics for discovering intersectional bias in machine learning", In Proceedings of 2019 IEEE Conference on Visual Analytics Science and Technology, arXiv:1904. 05419v1, Apr. 10, 2019.

Carter et al., "Exploring Neural Networks with Activation Atlas", Distill, 2019, https://distill.pub/2019/activation-atlas. doi: 10.23915/distill.00015.

Chung et al., "Slice Finder: Automated Data Slicing for Model Validation", 2019 IEEE 35th International Conference on Data Engineering (ICDE), 2019, pp. 1550-1553.

Deng et al., "ImageNet: A Large-Scale Hierarchical Image Database", 2009 IEEE Conference on computer vision and pattern recognition, 2009, pp. 248-255.

D'eon et al., "The Spotlight: A General Method for Discovering Systematic Errors in Deep Learning Models", 2022 ACM Conference on Fairness, Accountability, and Transparency, 2022, pp. 1962-1981.

Erhan et al., "Visualizing Higher-Layer Features of a Deep Neural Network", University of Montreal, 1341(3):1, Jun. 9, 2009.

Eyuboglu et al., "Domino: Discovering Systematic Errors With Cross-Modal Embeddings", International Conference on Learning Representations, 2022.

Ghorbani et al., "Interpretation of Neural Networks Is Fragile", The Thirty-Third AAAI Conference on Artificial Intelligence, 2019, pp. 3681-3688, vol. 33.

Gunning, "Explainable Artificial Intelligence (XAI)", Defense advanced research projects agency (DARPA), nd Web, 2(2): 1, 2017.

Halpern et al., "Causes and Explanations: A Structural-Model Approach", The British journal for the philosophy of science, 2005, pp. 843-887.

He et al., "Deep Residual Learning for Image Recognition", Computer Vision Foundation (In Proceedings of the IEEE Conference on Computer Vision and Pattern Recognition), 2016, pp. 770-778.

Hohman et al., "Summit: Scaling Deep Learning Interpretability by Visualizing Activation and Attribution Summarizations", IEEE, 11 Pages.

Kahng et al., "Visual Exploration of Machine Learning Results using Data Cube Analysis", Human-In-the-Loop Data Analytics, Jun. 2016, pp. 1-6.

Krishnakumar et al., "UDIS: Unsupervised Discovery of Bias in Deep Visual Recognition Models", 2021.

Lee et al., "VisCUIT: Visual Auditor for Bias in CNN Image Classifier", Proceedings of the IEEE/CVF Conference on Computer Vision and Pattern Recognition (CVPR).

Linardatos et al., "Explainable AI: A Review of Machine Learning Interpretability Methods", Entropy, 23(1):18, 2020.

Liu et al., "Deep Learning Face Attributes in the Wild", Computer Vision Foundation (In Proceedings of International Conference on Computer Vision), Dec. 2015, pp. 3730-3738.

Madaio et al., "Co-Designing Checklists to Understand Organizational Challenges and Opportunities around Fairness in AI", CHI Conference, 2020.

Mahendran et al., "Understanding Deep Image Representations by Inverting Them", Computer Vision Foundation (Proceedings of the IEEE Conference on Computer Vision and Pattern Recognition), 2015, pp. 5188-5196.

Mcinnes et al., "UMAP: Uniform Manifold Approximation and Projection for Dimension Reduction", arXiv:1802.03426v3, 2020.

Olah et al., "Feature Visualization", Distill, 2017, https://distill.pub/2017/feature-visualization. doi:10.23915/distill.00007.

Ozturk et al., "Automated detection of COVID-19 cases using deep neural networks with X-ray images", Computers in Biology and Medicine, 121:103792, 2020, Elsevier.

Pastor et al., "Looking for Trouble: Analyzing Classifier Behavior via Pattern Divergence", Sigmod'21, Virtual Event, Jun. 2021.

Pastor et al., "How divergent is your data?", Proceedings of the VLDB Endowment, vol. 14, No. 12, pp. 2835-2838, 2021.

Pedregosa et al., "Scikit-learn: Machine Learning in Python", Journal of Machine Learning Research 12, pp. 2825-2830, 2011.

Petsiuk et al., "RISE: Randomized Input Sampling for Explanation of Black-box Models", arXiv:1806.07421v3 [cs.CV], 2018.

Sagadeeva et al., "SliceLine: Fast, Linear-Algebra-based Slice Finding for ML Model Debugging", Sigmod'21, Virtual Event, Jun. 2021.

Sagawa et al., "Distributionally Robust Neural Networks for Group Shifts: On the Importance of Regularization for Worst-Case Generalization", arXiv:1911.08731v1, Nov. 2019.

Selvaraju et al., "Grad-CAM: Visual Explanations from Deep Neural Networks via Gradient-based Localization", Computer Vision Foundation (Proceedings of the IEEE international conference on computer vision), pp. 618-626, 2017.

Simonyan et al., "Very Deep Convolutional Networks for Large-Scale Image Recognition", arXiv:1409.1556v1, Sep. 2014.

Singla et al., "Core Risk Minimization using Salient ImageNet", Mar. 2022, arXiv:2203.15566v1.

Sohoni et al., "No Subclass Left Behind: Fine-Grained Robustness in Coarse-Grained Classification Problems", Advances in Neural Information Processing Systems, 33:19339-19352, 2022.

Tjoa et al., "A Survey on Explainable Artificial Intelligence (XAI): Toward Medical Xai", IEEE transactions on neural networks and learning systems, 32(11):4793-4813, 2020.

Wah et al., "The Caltech-UCSD Birds-200-2011 Dataset", 2011.

Wu et al., "Errudite: Scalable, Reproducible, and Testable Error Analysis", In Proceedings of the 57th Annual Meeting of the Association for Computational Linguistics, 2019.

Zhang et al., "Correct-N-Contrast: A Contrastive Approach for Improving Robustness to Spurious Correlations", arXiv.2203. 01517v1, Mar. 2022.

Zhang et al., "SliceTeller: A Data Slice-Driven Approach for Machine Learning Model Validation", IEEE Transactions on Visualization and Computer Graphics, Jan. 2023, vol. 29(1), pp. 842-852.

Zhou et al., "Learning Deep Features for Discriminative Localization", Computer Vision Foundation (In proceedings of the IEEE conference on computer vision and pattern recognition), pp. 2921-2929, 2016.

Zhou et al., "Places: A 10 million Image Database for Scene Recognition", IEEE Transactions on Pattern Analysis and Machine Intelligence, 2017.

Zhou et al., "Learning with Local and Global Consistency", Neural information processing systems, 2003.

Rudin., "Stop Explaining Black Box Machine Learning Models for High Stakes Decisions and Use Interpretable Models Instead", Sep. 22, 2019, pp. 1-20, arXiv:1811.10154v3.

Khan et al., "Transformers in Vision: A Survey", Jan. 19, 2022, pp. 1-10, arXiv:2101.01169v5.

* cited by examiner

100

Computing Device

110 — Processor

150 — Comm Modules

120 — Memory

160 — Data-Slice Visualization Application

12 — Machine Learning Model

130 — Screen

140 — User Interface

102 — Database

170 — Training/Validation Dataset(s)

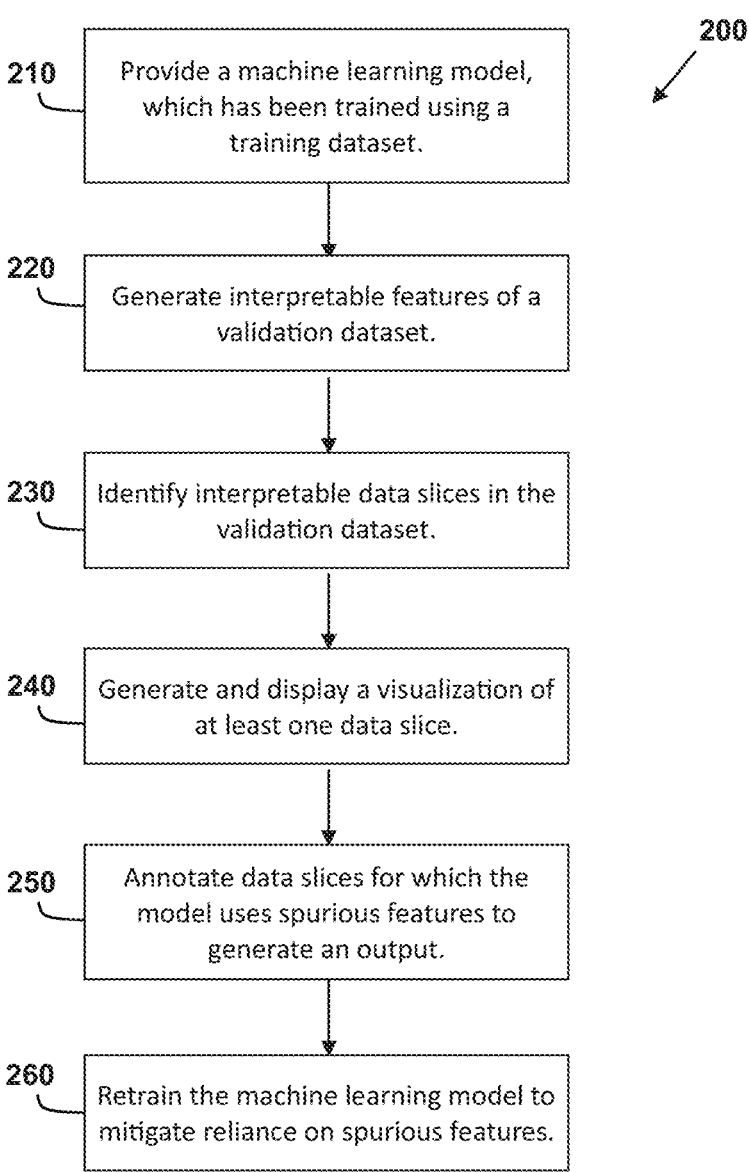

200

210  Provide a machine learning model, which has been trained using a training dataset.

220  Generate interpretable features of a validation dataset.

230  Identify interpretable data slices in the validation dataset.

240  Generate and display a visualization of at least one data slice.

250  Annotate data slices for which the model uses spurious features to generate an output.

260  Retrain the machine learning model to mitigate reliance on spurious features.

| Training Procedure | Clean Acc (%) | Core Acc (%) | Spurious Acc (%) | RCS (%) |
|---|---|---|---|---|
| Baseline | 98.02688 | 97.21170 | 97.61917 | 0.067720 |
| AS (Annotation) | 98.02688 | 98.02185 | 96.92958 | 0.216351 |
| AS (Propagation) | 98.08225 | 98.16278 | 96.01852 | 0.368512 |

| Training Procedure | Clean (acc ↑) | Core (Acc ↑) | Spurious (Acc ↑) | RCS (↑) |
|---|---|---|---|---|
| Baseline | 85.73812 | 82.98582 | 82.82901 | 0.004878 |
| AS (Annotation) | 89.57465 | 86.40534 | 79.81651 | 0.195062 |
| AS (Propagation) | 90.40867 | 87.40617 | 77.89825 | 0.274038 |

FIG. 13

VISUAL ANALYTICS FRAMEWORK FOR EXPLAINABLE DATA SLICING-BASED MODEL VALIDATION

FIELD

The device and method disclosed in this document relates to visual analytics for machine learning and, more particularly, to a visual analytics framework for explainable data slicing-based model validation.

BACKGROUND

Unless otherwise indicated herein, the materials described in this section are not admitted to be the prior art by inclusion in this section.

Machine Learning (ML) model validation refers to the process of determining and understanding when and why a model succeeds or fails. As machine learning technologies prevail in various fields, model validation becomes increasingly crucial to provide greater model transparency, accountability, and accuracy. One such method for machine learning model validation is Data Slice-Finding, which seeks to identify specific instances or data subsets, namely data-slices, for which a model underperforms compared to the overall dataset. These data slices are usually defined by tabular features or additional meta-information, such as when and where the data was collected. The problematic data slices may arise from under-representative feature sets, such as waterbirds only being shown with a water background but not with a general forest background, or biased samples, such as a subset of face images consisting mostly of males.

Once the problematic data slices have been identified, model developers might attempt to improve performance of the models with two strategies. First, developers might simply retrain or fine-tune the models with a focus on these subgroups of data to improve the overall reliability of the models. Second, developers might attempt to identify potential underlying causes that impact the model's accuracy using explainable Artificial Intelligence (XAI) techniques, and manipulate the model's internal parameters to improve the model's performance. However, despite the promising benefits of data slice-finding and XAI techniques for explaining problematic data slices, there are still challenges that need to be addressed for thorough model validation.

State-of-the-art data slice-finding methods require extensive metadata associated with the validation datasets, and collecting such metadata generally involves significant human effort or additional machine learning components, which are costly. Slice-finding methods work by grouping the data into subsets that share a common characteristic. For the data groups to be interpretable by humans, additional metadata is required. While some current techniques use tabular metadata (labels) to compute the slices, others apply multi-modal pre-trained vision-language models to generate these labels. When no metadata or suitable pre-trained models are available, understanding the data subgroups produced by slice finding becomes a time-consuming and challenging task. Particularly, users must inspect multiple data samples of a data-slice individually in order to formulate hypotheses and understand the details of the slice.

Using XAI techniques to uncover the root causes of a model's failure with respect to troublesome data slices also requires non-trivial efforts. Particularly, there are a few distinct challenges. Firstly, most XAI techniques are instance-based, and it is practically infeasible to go through all instances to draw broad conclusions. Additionally, it is challenging to summarize failure patterns and to gain actionable insights without in-depth investigation.

SUMMARY

A method for validating a vision model is disclosed. The vision model is configured to receive an input image and provide at least one output label. The method comprises storing, in a memory, a plurality of validation images. The method further comprises determining, with a processor, using the vision model, a plurality of first feature vectors including a respective first feature vector for each respective validation image in the plurality of validation images. The method further comprises identifying, with the processor, a plurality of groups of validation images from the plurality of validation images, based on the plurality of first feature vectors. The method further comprises displaying, on a display screen, a visualization of at least one group of validation images from the plurality of groups of validation images.

A method for validating a machine learning model is disclosed. The machine learning model is configured to receive an input data sample and provide at least one output label. The method comprises storing, in a memory, a plurality of validation data samples. The method further comprises determining, with a processor, using the machine learning model, a plurality of first feature vectors including a respective first feature vector for each respective validation data sample in the plurality of validation data samples. The method further comprises identifying, with the processor, a plurality of groups of validation data samples from the plurality of validation data samples, based on the plurality of first feature vectors. The method further comprises displaying, on a display screen, a visualization of at least one group of validation data samples from the plurality of groups of validation data samples.

A system for validating a machine learning model is disclosed. The machine learning model is configured to receive an input data sample and provide at least one output label. The system comprises a display screen configured to display a graphical user interface. The further system comprises at least one memory configured to store program instructions of the machine learning model, a plurality of validation data samples, and a plurality of training data samples. The further system comprises at least one processor. The at least one processor is configured to determine, using the machine learning model, a plurality of first feature vectors including a respective first feature vector for each respective validation data sample in the plurality of validation data samples. The at least one processor is further configured to identify a plurality of groups of validation data samples from the plurality of validation data samples. The at least one processor is further configured to display, within the graphical user interface, a visualization of at least one group of validation data samples from the plurality of groups of validation data samples. The at least one processor is further configured to annotate, with at least one annotation, based on user inputs, at least one respective group of validation data samples from the plurality of groups of validation data samples. The at least one processor is further configured to modify training data samples in the plurality of training data samples based on the least one annotation. The at least one processor is further configured to retrain the machine learning model using the modified plurality of training data samples.

BRIEF DESCRIPTION OF THE DRAWINGS

The foregoing aspects and other features of the method and system are explained in the following description, taken in connection with the accompanying drawings.

FIG. 3 shows a flow diagram for a method for analyzing and validating the performance of a machine learning model.

FIG. 12 shows a table summarizing the quantitative evaluation of the overall performance of the hair color classification model.

FIG. 13 shows a table summarizing the quantitative evaluation of the overall performance of the bird category classification model.

DETAILED DESCRIPTION

Figure 1:
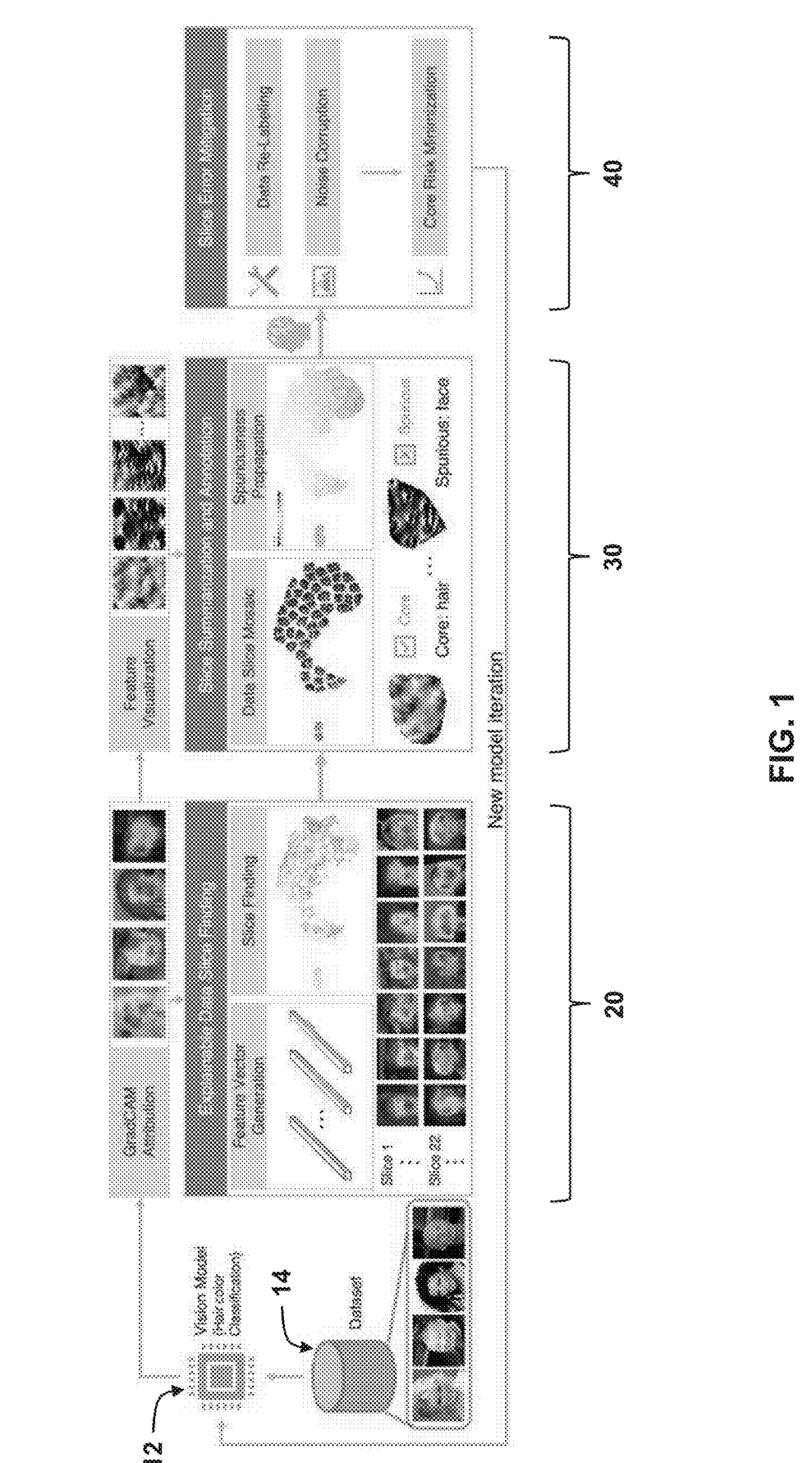
FIG. 1 summarizes a workflow for visual analytics using explainable data slices, which does not require any metadata.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

Overview

Data slice-finding is an emerging technique for evaluating machine learning models by finding subgroups with poor performance in a targeted dataset. These subgroups are generally defined by feature sets or metadata. Despite its usefulness, data slice-finding presents two challenges for unstructured image data: (1) data slice-finding conventionally requires additional metadata, which is labor-intensive and costly to provide, and (2) data slice-finding conventionally needs non-trivial efforts to interpret the root causes of the under-performing data slices. To address these challenges, a novel human-in-the-loop visual analytics workflow is disclosed for data-slicing based machine learning model validation.

FIG. 1 summarizes a workflow 10 for visual analytics using explainable data slices, which does not require any metadata. The workflow 10 enables a user to validate and improve a machine learning model 12 that has been trained using a dataset 14. In at least some embodiments, the machine learning model 12 is a vision model (e.g., a hair color classification model) and the dataset 14 includes a large number of images (e.g., images including people with hair). The workflow 10 generally comprises three phases: an Explainable Data Slice-Finding phase 20, a Slice Summarization and Annotation phase 30, and a Slice Error Mitigation phase 40.

In the Explainable Data Slice-Finding phase 20, the workflow 10 employs pixel attributions to create interpretable features of the dataset 14. In one embodiment, the Gradient-weighted Class Activation Mapping (GradCAM) method is used to generate feature vectors by extracting model attributions in the latent space. In some embodiments, the extracted features are weighted to form weighted feature vectors. Finally, the weighted feature vectors are clustered to identify data slices. In this way, dataset 14 can be sliced based on the intrinsic behavior of the machine learning model 12.

Next, in the Slice Summarization and Annotation phase 30, the workflow 10 transforms the generated features into one or more visualizations, including a 'Data Slice Mosaic' and other visual summaries that elucidate the model's reasoning for a given data slice. With the help of the data slice mosaic and spuriousness (label) propagation, users can identify and annotate slice error types such as core/spurious correlations and noisy (incorrect) labels. In this way, the workflow 10 adopts a human-in-the-loop approach to rank and annotate the problematic data slices based on common error types.

Finally, in the Slice Error Mitigation phase 40, the workflow 10 leverages the annotation and user-verified spuriousness to mitigate slice errors in the machine learning model 12. The error mitigation techniques include re-labeling data in the dataset 14, if needed, and applying Core Risk Minimization (CoRM) techniques if spurious correlations are detected. In this way, the annotated slices can be used to enhance the performance of the machine learning model 12 by identifying and correcting errors on either the model or data side.

The visual analytics workflow 10 provides many advantages compared with conventions visual analytics and model validation techniques. Particularly, the visual analytics workflow 10 is advantageously able to find explainable slices in the data based on explainable features extracted from pixel attributions without any additional metadata, such as textual annotations or cross-model embeddings. The visual analytics workflow 10 can advantageously identify critical model problems, including spurious features and mislabeled data. The visual analytics workflow 10 advantageously provides a graphical user interface with data slice mosaics that enables users to quickly browse data slice summaries in order to gain insights into model behavior. In this way, users are able to quickly understand the contents of data slices, reducing the need to examine individual data samples. Finally, the visual analytics workflow 10 closes the loop by allowing domain experts to mitigate model problems with the resulting insight summarization and a state-of-the-art neural network regularization technique.

Design Goals

The visual analytics workflow 10 is a novel approach to metadata-free validation of machine learning models based on slice-level analysis. To facilitate a comprehensive understanding of the workflow 10, the design goals that informed the development and design of the workflow 10 are discussed.

Slice-Finding has attracted considerable attention in recent times due to its ability to facilitate a comprehensive evaluation of machine learning models. However, a crucial gap has been identified in slice-based model validation systems for machine learning models, particularly for vision models. This task is particularly difficult for vision models because the data is not structured. More specifically, these systems require metadata or language-vision models to generate meaningful data slices, which is not always feasible. When metadata are not available, obtaining it can be a laborious annotation process that entails significant human effort and financial resources. Furthermore, the language-vision models used are often trained on general-purpose datasets that may not be sufficiently representative of specific domains. This issue raises doubts about the adaptability of these models in custom domains. Based on these observations, the following design goals are compiled for a metadata-free slice-driven model validation workflow:

Design Goal 1: Metadata-less and model-less. It is advantageous if the data slice-finding method of the workflow 10 can generate meaningful data slices without the need for any metadata or vision-language models. The workflow 10 should be able to identify data slices that share a significant pattern.

Design Goal 2: Interpretability. It is advantageous if the workflow 10 supports meaningfully interpreting the identified data slice. In contrast to previous metadata-free slice-finding methods for vision tasks, the workflow 10 should enable the user to gain an explicit understanding of why particular data samples are grouped in one slice.

Design Goal 3: Slice Overview. It is advantageous if the workflow 10 minimizes or eliminates any need for individual inspection of each image in a data slice. The workflow 10 should provide a summary of the slices to reduce the time required for analysis, especially when there are a large number of data slices.

Design Goal 4: Actionable insights. It is advantageous if the workflow 10 provides actionable insights by allowing users to annotate and export data slices. This allows further expert interactions, such as re-labeling or model re-training, leading to improved model performance.

Based on the descriptions herein, it will be appreciated that the disclosed visual analytics methods and systems achieve each of these four design goals.

Exemplary Hardware Embodiment

Figure 2:
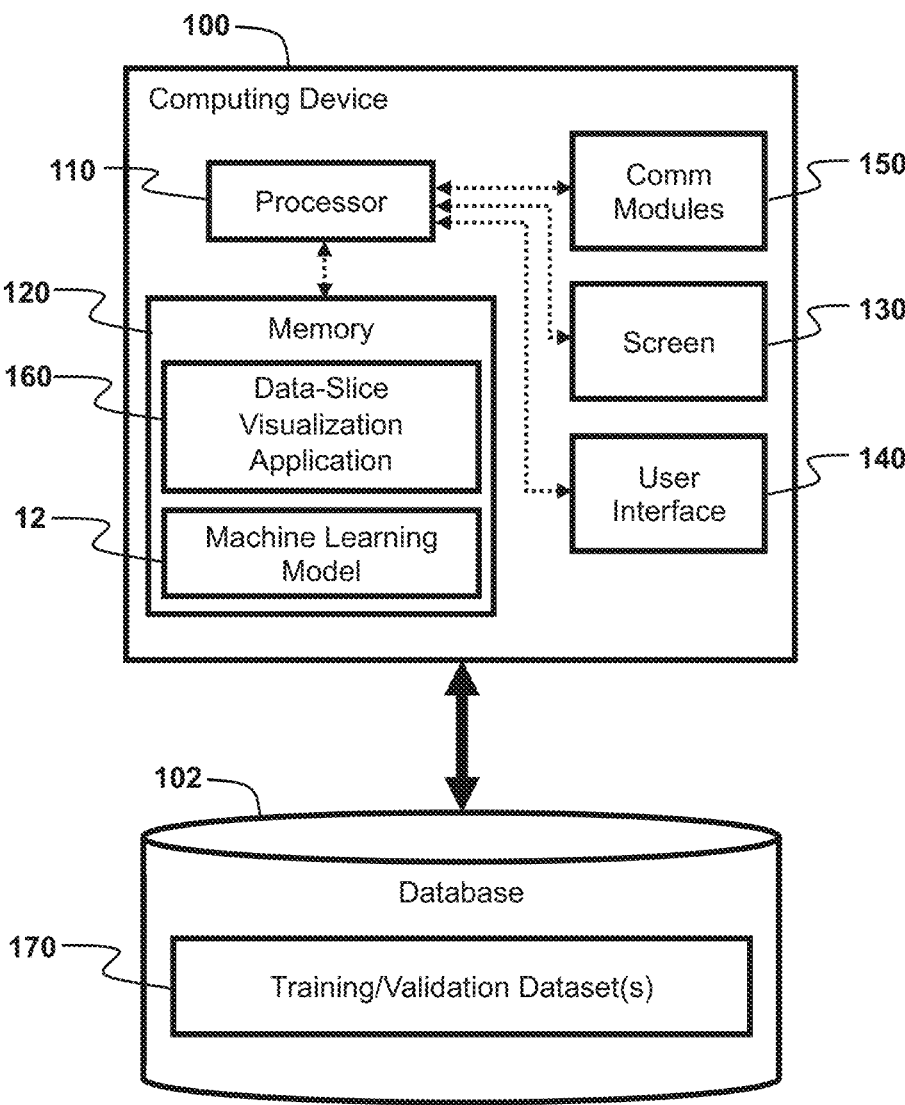
FIG. 2 shows an exemplary embodiment of a computing device that can be used for data-slicing based machine learning model analysis and validation.

FIG. 2 shows an exemplary embodiment of a computing device 100 that can be used for data-slicing based machine learning model analysis and validation, without the need for metadata. The computing device 100 comprises a processor 110, a memory 120, a display screen 130, a user interface 140, and at least one network communications module 150. It will be appreciated that the illustrated embodiment of the computing device 100 is only one exemplary embodiment and is merely representative of any of various manners or configurations of a server, a desktop computer, a laptop computer, mobile phone, tablet computer, or any other computing devices that are operative in the manner set forth herein. In at least some embodiments, the computing device 100 is in communication with a database 102, which may be hosted by another device or which is stored in the memory 120 of the computing device 100 itself.

The processor 110 is configured to execute instructions to operate the computing device 100 to enable the features, functionality, characteristics and/or the like as described herein. To this end, the processor 110 is operably connected to the memory 120, the display screen 130, and the network communications module 150. The processor 110 generally comprises one or more processors which may operate in parallel or otherwise in concert with one another. It will be recognized by those of ordinary skill in the art that a "processor" includes any hardware system, hardware mechanism or hardware component that processes data, signals or other information. Accordingly, the processor 110 may include a system with a central processing unit, graphics processing units, multiple processing units, dedicated circuitry for achieving functionality, programmable logic, or other processing systems.

The memory 120 is configured to store data and program instructions that, when executed by the processor 110, enable the computing device 100 to perform various operations described herein. The memory 120 may be any type of device capable of storing information accessible by the processor 110, such as a memory card, ROM, RAM, hard drives, discs, flash memory, or any of various other computer-readable media serving as data storage devices, as will be recognized by those of ordinary skill in the art.

The display screen 130 may comprise any of various known types of displays, such as LCD or OLED screens, configured to display graphical user interfaces. The user interface 140 may include a variety of interfaces for operating the computing device 100, such as buttons, switches, a keyboard or other keypad, speakers, and a microphone. Alternatively, or in addition, the display screen 130 may comprise a touch screen configured to receive touch inputs from a user.

The network communications module 150 may comprise one or more transceivers, modems, processors, memories, oscillators, antennas, or other hardware conventionally included in a communications module to enable communications with various other devices. Particularly, the network communications module 150 generally includes an ethernet adaptor or a Wi-Fi® module configured to enable communication with a wired or wireless network and/or router (not shown) configured to enable communication with various other devices. Additionally, the network communications module 150 may include a Bluetooth® module (not shown), as well as one or more cellular modems configured to communicate with wireless telephony networks.

The memory 120 stores program instructions of a data-slice visualization application 160. Additionally, the memory 120 stores program instructions and parameters (e.g., kernel weights, model coefficients, etc.) of a machine learning model 12. In at least some embodiments, the database 102 stores a dataset 170 comprising a plurality of data samples, e.g., images. The data samples may include training and validation pairs, each comprising including a respective data sample, e.g., an image, and at least one label, e.g., a hair color label, associated with the respective data sample.

Methods for Visualizing Data Slices

A variety of operations and processes are described below for operating the computing device 100 to provide data-slicing based machine learning model analysis and validation, without the need for metadata. In these descriptions, statements that a method, processor, and/or system is performing some task or function refers to a controller or processor (e.g., the processor 110 of the computing device 100) executing programmed instructions stored in non-transitory computer readable storage media (e.g., the memory 120 of the computing device 100) operatively connected to the controller or processor to manipulate data or to operate one or more components in the computing device 100 or of the database 102 to perform the task or function. Additionally, the steps of the methods may be performed in any feasible chronological order, regardless of the order shown in the figures or the order in which the steps are described.

FIG. 3 shows a flow diagram for a method 200 for analyzing and validating the performance of a machine learning model. The method 200 advantageously enables users to interpret and explain data slices in the training or validation datasets, without any additional metadata. The method 200 advantageously enables users to identify critical model problems in the model and the datasets, including spurious features and mislabeled data. The method 200 advantageously provides a graphical user interface with intuitive data slice mosaics that enable users to quickly browse data slice summaries in order to gain insights into model behavior. In this way, users are able to quickly understand the contents of data slices, reducing the need to examine individual data samples. Finally, the method 200 enables users to mitigate problems with the model using the resulting insight summarization and a state-of-the-art neural network regularization technique.

The method 200 begins with providing a machine learning model, which has been trained using a training dataset (block 210). Particularly, the processor 110 receives and/or the memory 120 stores program instructions and parameters (e.g., kernel weights, model coefficients, etc.) of a machine learning model 12 that is to be the subject of analysis and validation. As used herein, the term "machine learning model" refers to a system or set of program instructions and/or data configured to implement an algorithm, process, or mathematical model (e.g., a neural network) that predicts or otherwise provides a desired output based on a given input. It will be appreciated that, in general, many or most parameters of a machine learning model are not explicitly programmed and the machine learning model is not, in the traditional sense, explicitly designed to follow particular rules in order to provide the desired output for a given input. Instead, a machine learning model is provided with a corpus of training data from which it identifies or "learns" patterns and statistical relationships in the data, which are generalized to make predictions or otherwise provide outputs with respect to new data inputs. The result of the training process is embodied in a plurality of learned parameters (e.g., kernel weights, model coefficients, etc.) that are used in the various components of the machine learning model to perform various operations or functions.

In some embodiments, the machine learning model 12 is a vision model, such as an image classification model. In one example, the machine learning model 12 is a vision model configured to receive an image and output a hair color classification (e.g., not gray hair, gray hair) of at least one person represented in the image. Similarly, in another example, the machine learning model 12 is a vision model configured to receive an image and output a bird category classification of at least one bird represented in the image. In other embodiments, the machine learning model 12 may comprise other types of vision models, such as object detection models or image segmentation models.

In at least some embodiments, the machine learning model 12 is a convolutional neural network (CNN) model. It will be appreciated that CNNs are a type of feed-forward neural networks that contain a number of convolutional layers. A conventional convolution layer receives an input, and applies one or more convolutional filters to the input. A convolutional filter, also referred to as a kernel, is a matrix of weights, also referred to as parameters or filter values, which is applied to various chunks of an input matrix such that the matrix of weights is convolved over the input matrix to provide an output matrix. The various layers and filters of a CNN are used to detect various "features" of the input. However, it should be appreciated that machine learning model 12 may comprise any architecture of neural network model, such as Transformer-based architectures (e.g., Vision Transformer) or recurrent neural network-based architectures.

Finally, the processor 110 receives and/or the database 102 stores a dataset 170 including a plurality of data samples. The plurality of data samples includes a plurality of validation data samples and a plurality of training data samples that were used to train the machine learning model 12. In general, the plurality of validation data samples comprises data samples that were not used to train the machine learning model 12. The plurality of data samples may include data-label pairs, each comprising including a respective data sample and at least one label associated with the respective data sample. In the case of a vision model, the data-label pairs each include an image and a label (e.g., a hair color classification label, object detection bounding boxes, image segmentation labels, etc.).

The method 200 continues with generating interpretable features of a validation dataset (block 220). Particularly, the processor 110 determines a plurality of weighted feature vectors $F_W$ including a respective weighted feature vector $F_W$ for each respective validation data sample in the plurality of validation data samples. Additionally, in some embodiments, the processor 110 further determines a plurality of top-attributed feature vectors $F_T$ including a respective top-attributed feature vector $F_T$ for each respective validation data sample in the plurality of validation data samples.

In some embodiments in which the machine learning model 12 is a neural network having a plurality of layers, the processor 110 generates each weighted feature vector $F_W$ by inputting the respective validation data sample into the machine learning model 12, extracting a respective intermediate output F of at least one intermediate neural network layer of the machine learning model 12, and determining the respective weighted feature vector $F_W$ based on the respective intermediate output. More particularly, in some embodiments, the processor 110 determines a weight matrix W based on model gradients of the machine learning model 12, e.g., using gradient-based a Class Activation Mapping (CAM) method such as GradCAM, GradCAM++, Smooth-CAM. Next, the processor 110 determines the respective weighted feature vector $F_W$ by determining a weighted average of the respective intermediate output F along at least one dimension using the weight matrix W. Similarly, the processor 110 determines each respective top-attributed feature vector $F_T$ by determining a maximum weighted value in the respective intermediate output F along at least one dimension using the weight matrix W.

Figure 4:
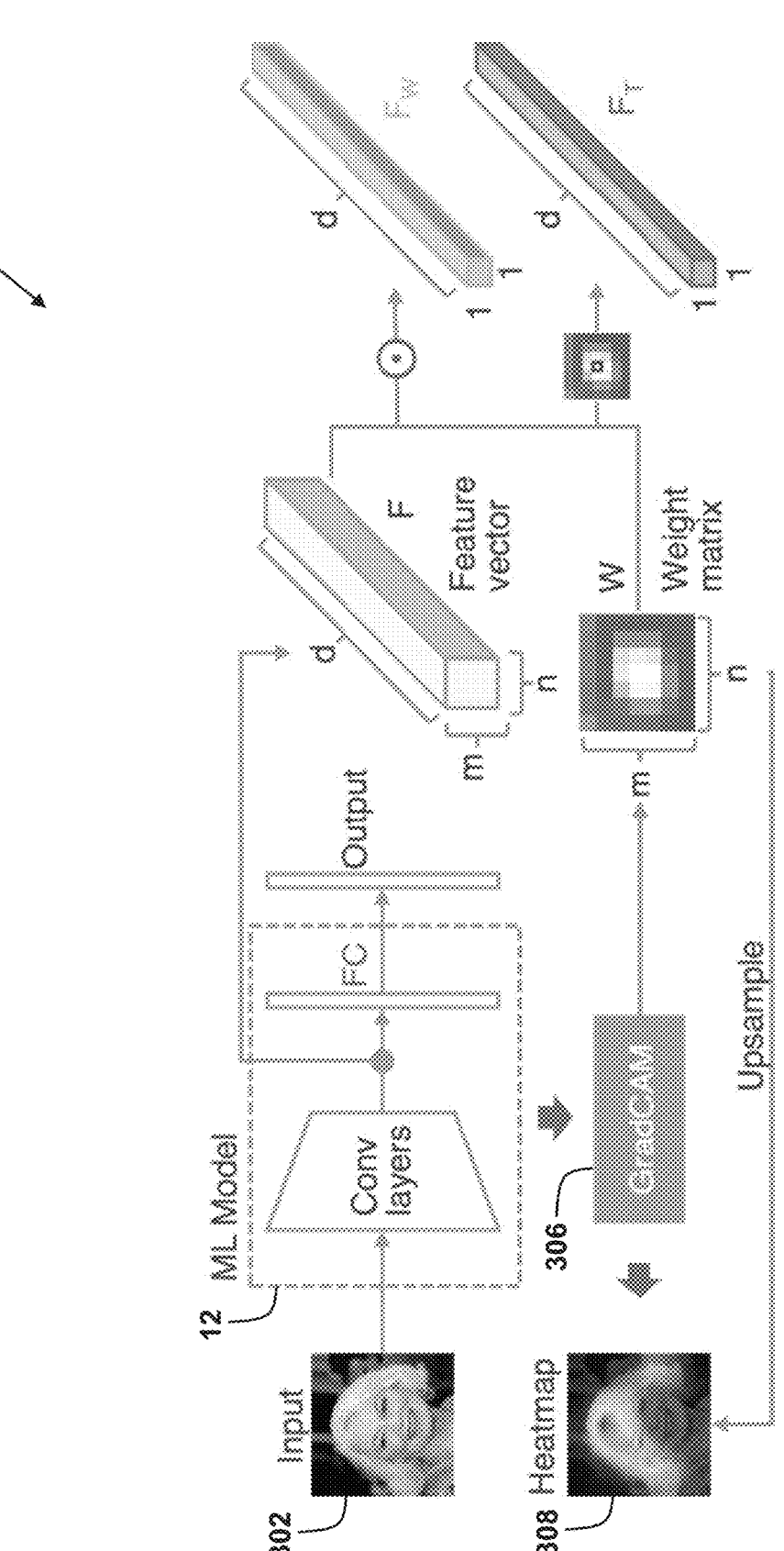
FIG. 4 shows an exemplary workflow for determining the feature vectors for each validation data sample.

FIG. 4 shows an exemplary workflow 300 for determining the respective feature vectors $F_W$ and $F_T$ for each validation data sample in the dataset. The processor 110 inputs a respective validation data sample, in particular an image 302, into the machine learning model 12. In the illustrated embodiment, the machine learning model 12 is a CNN model having a set of convolutional layers followed by a fully connected layer. The processor 110 extracts a latent space feature vector F from an intermediate output of the machine learning model 12. In one embodiment, the feature vector F is the output from a final convolution layer before the fully connected layer of the machine learning model 12. The resulting feature vector F has dimensions m×n×d.

Next, the processor 110 utilizes model gradients to generate a weight matrix W with dimensions m×n. More particularly, the processor 110 computes GradCAM pixel attributions using the GradCAM method 306 for this image and also extract its internal weight matrix W. In some embodiments, the processor 110 upsamples the matrix W to an image size of the image 302 and normalizes the weights to generate a heatmap 308 for GradCAM explanations.

Based on the feature vector F and weight matrix W, the processor 110 determines the respective weighted feature vector $F_W$ as a weighted average (dot product) of the respective feature vector F along the m×n dimensions, using the weight matrix W, to arrive at the respective weighted feature vector $F_W$ having dimensions 1×1×d. In other words, an attribution-weighted feature vector $F_W$ is defined as the weighted average of the d-dimensional partial vectors in F, where each feature vector is weighted by its corresponding pixel attribution value in W. The resulting $F_W$ is of shape 1×1×d and this can be expressed mathematically as follows:

$$F_W = \frac{\sum_{i=1,j=1}^{i=m,j=n} F_{ij} W_{ij}}{\sum_{i=1,j=1}^{i=m,j=n} W_{ij}}$$

Finally, it is also helpful to know what features contribute most to the model's decision. Accordingly, based on the feature vector F and weight matrix W, the processor 110 determines each respective top-attributed feature vector $F_T$ by determining a maximum weighted value in the respective feature vector F along the m×n dimensions, using the weight matrix W, to arrive at the respective weighted feature vector $F_T$ having dimensions 1×1×d. In other words, the top-attributed spatial feature vector $F_T$ is defined as the feature vector corresponding to the region of maximal GradCAM pixel attribution. $F_T$ can be expressed by: $F_T = F_{i^*,j^*}$, where i*, $j^* = \mathrm{argmax}_{i,j} W_{i,j}$. As will be discussed below, $F_T$ is used to generate data slice summaries with feature visualization.

The method 200 continues with identifying interpretable data slices in the validation dataset (block 230). Particularly, the processor 110 identifies a plurality of data slices from the plurality of validation data samples. Each data slice comprises a group of validation data samples in the plurality of validation data samples of the dataset 170, for which the machine learning model 12 focuses or relies upon similar features to generate a prediction. In at least some embodiments, each data slice is an image data slice having a subset of images for which the machine learning model 12 focuses or relies upon similar image features to generate a prediction. In at least some embodiments, the processor 110 identifies the plurality of data slices by clustering the plurality of weighted feature vectors $F_W$. The processor 110 forms each respective data slice as a group of validation data samples having corresponding weighted feature vectors $F_W$ that were clustered together on the basis of their common or similar features.

In some embodiments, the processor 110 uses K-means to perform the clustering. In some embodiments, the processor 110 reduces the dimensions of the plurality of weighted feature vectors $F_W$ to 2D space prior to performing the clustering. In particular, the processor 110 maps the plurality of weighted feature vectors $F_W$ onto a two-dimensional space, for example using the Uniform Manifold Approximation and Projection (UMAP) method. This has the effect of reducing dimensionality, and will provide 2D spatial information for generating a data slice mosaic. The parameters in UMAP, such as n_neighbors and min_dist, are fine-tuned to ensure well-separated subgroups of data. In some embodiments, to avoid missing or overlooking rare data slices, the processor 110 applies over-clustering by increasing the value of K until a more coherent grouping of samples is achieved, as indicated by consistent model behaviors within each data slice.

It should be appreciated that the resulting data slices enable the system to group together validation data samples that correspond to coherent attributions from the machine learning model 12. This is the unique aspect of the slice-based approach leveraged by the method 200, which is different from traditional clustering analysis. Particularly, traditional clustering uses features from the whole image to group data and results in many ambiguous clusters. In contrast, the method 200 leverages interpretable feature subsets with semantics to "slice" the original image data. For instance, in the example of a hair color classification model, the data slices would contain images where the model focuses on similar features, such as "Hair", "Mouth", "Eyes", "Face", or "Background". This facilitates easy troubleshooting of each data slice by domain or machine learning experts who can inspect the images and attributions within each data slice. However, as will be appreciated from the descriptions below, the method 200 further reduces human effort by at least partially automating the investigation of individual validation data samples.

The method 200 continues with generating and displaying a visualization of at least one data slice (block 240). Particularly, the processor 110 generates and displays, on the display screen 130, a visualization of at least one data slice from the plurality of data slices. Individual inspection of validation data samples within data slices can be a time-consuming task. Therefore, a more efficient method is needed to summarize the content of each data slice for users. To address this, in at least some embodiments, the visualization(s) take the form of a data slice mosaic that leverages feature visualization to generate visual summaries of data slices in a mosaic representation. Particularly, the data slice mosaic comprises a plurality of feature visualizations corresponding to individual data slices, which are arranged as a mosaic. The position of each mosaic tile in the data slice mosaic is representative of the similarity of the features focused or relied upon by the machine learning model 12 in each data slice compared to other data slices. Each feature visualization is a visual representation of the features focused or relied upon by the machine learning model 12 for generating an output with respect to the validation data samples of the respective data slice.

The processor 110 operates the display screen 130 to display a variety of graphical user interfaces, which include the data slice mosaic, as well as other tools for exploring and analyzing the data slices. These graphical user interfaces advantageously enable the user to view summarized visual patterns for each data slice, verify insights with GradCAM visual explanations, and annotate issues that are uncovered, such as spurious correlations or incorrect labels.

Figure 5A:
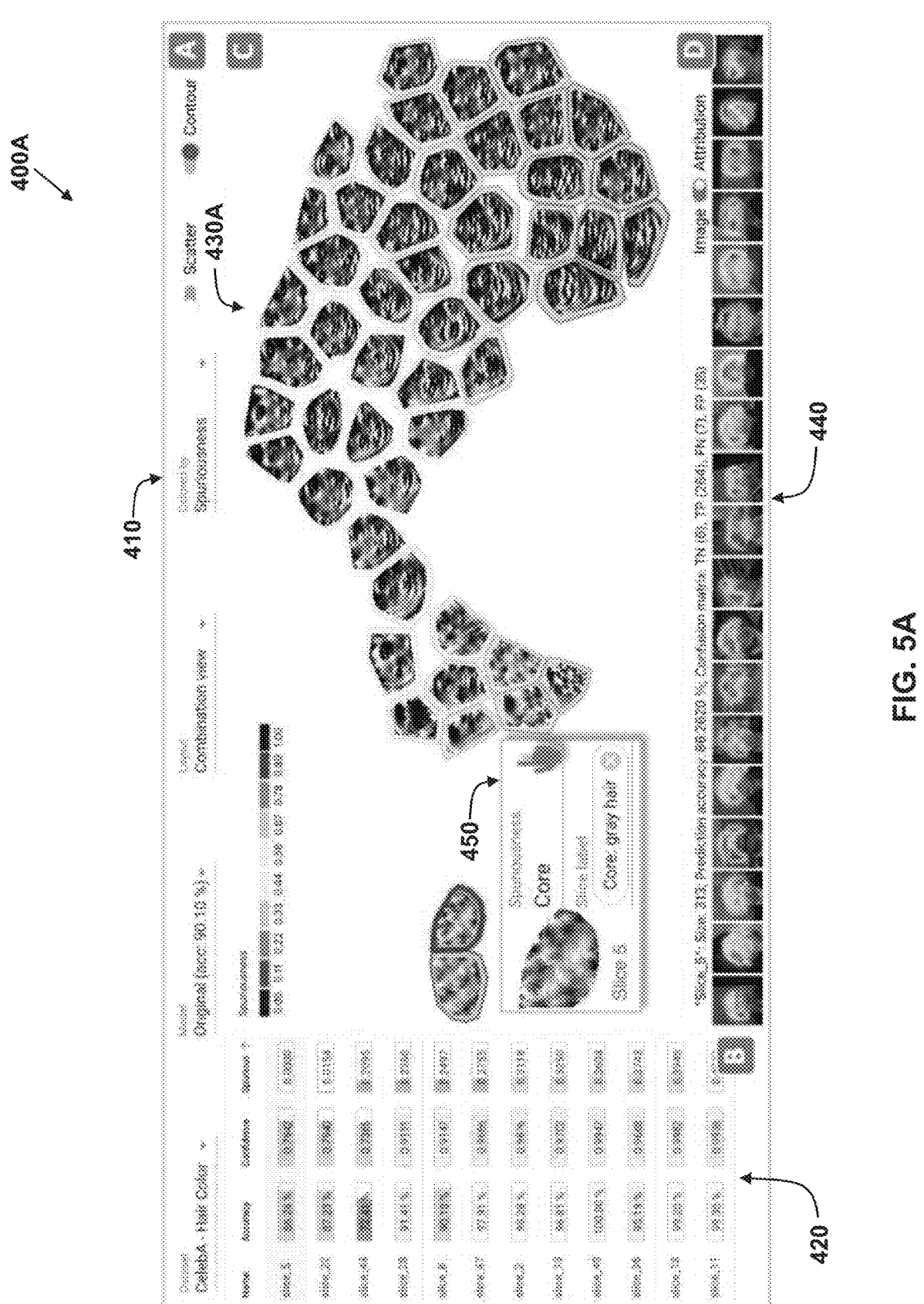
FIGS. 5A and 5B show exemplary graphical user interfaces for visually analyzing data slices FIG. 6 summarizes a workflow for generating the data slices mosaics for a vision model.
Figure 5B:
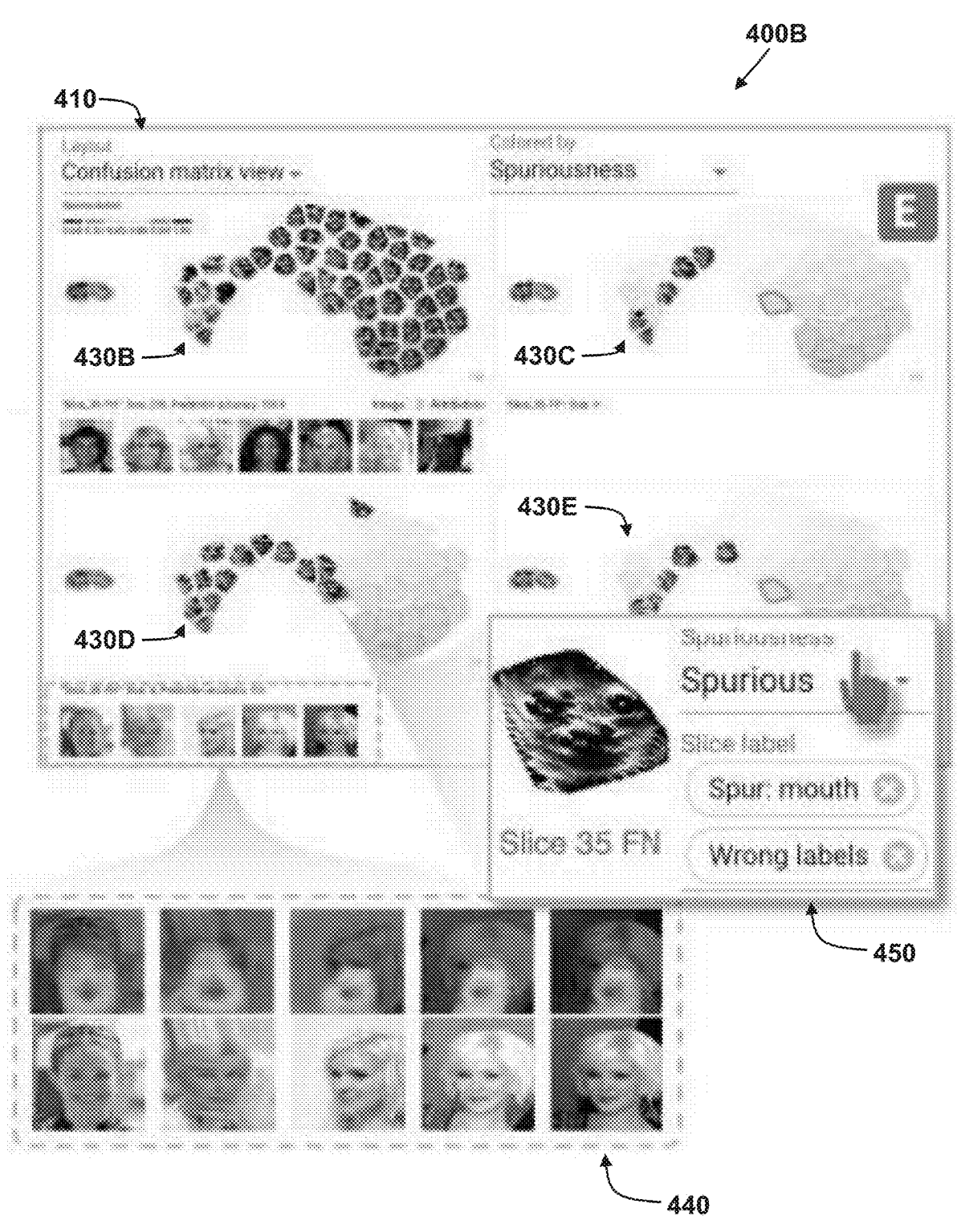

FIGS. 5A and 5B show exemplary graphical user interfaces 400A, 400B for visually analyzing data slices. The graphical user interfaces 400A, 400B are illustrated in the context of an exemplary vision model, which has been trained on the CelebA image dataset, and which is configured to receive an image and output a hair color classification label (e.g., not gray hair, gray hair) of at least one person represented in the image. However, it should be appreciated that an essentially similar graphical user interface can be provided regardless of the form or function of the machine learning model 12 to which the method is being applied.

The graphical user interfaces 400A and 400B include a system menu 410 via which a user can select the dataset and model that are to be analyzed and validated, as well as select a variety of visualization layout and coloring options. Users can choose between two visualization layouts: Combination view or Confusion Matrix view, which allows them to get an overview of the data slices, or inspect them in more detail by splitting them across error types. The user can also select a coloring matrix that best suits their needs, choosing from Slice Name, Slice Accuracy, Slice Confidence, and Spuriousness probability. The user can also enable or disable scatter plots, feature visualizations, and contour visibility.

The graphical user interface 400A includes a slice table 420 via which a user can navigate and select different data slices for visualization. The slice table 420 enables the user to easily sort the data slices depending on various metrics, including accuracy, confidence, and spuriousness probability. The processor 110 computes the accuracy and confidence metrics based on model outputs with respect to the data slices. The processor 110 generates the spuriousness probability metric using a label propagation method based on the users' annotation(s), which is described in further detail below. Users can sort the data slices based on a selected metric or click specific table cells to investigate the corresponding slice's information (e.g., feature visualizations or pixel attribution heatmaps) in other views, which coordinates numerical metrics with qualitative model behaviors, enabling a more interpretable model validation. The slice table 420 enables users to identify interesting slice patterns, such as core features with low accuracy, which could suggest that there are mislabeled validation data samples in the slice. Alternatively, a spurious slice with high accuracy could indicate that the spurious feature is able to discriminate the model predictions, and therefore the model is not robust to these correlations.

The graphical user interfaces 400A and 400B include data slice mosaics 430A-430E. The data slice mosaics 430A-430E comprise a plurality of feature visualizations displayed with tiles that are arranged together to form a mosaic. The data slice mosaics 430A-430E portray the dominant visual patterns of each data slice from the model's perspective. The data slice mosaics 430A-430E can be displayed in a combination form (data slice mosaic 430A in FIG. 5A) or as a confusion matrix form showing separate data slice mosaics with different data subsets split by the model's confusion matrix (data slice mosaics 430B-430E in FIG. 5B showing true positives, true negatives, false positives, and false negatives). The data slice mosaic 430B shows a rate of true-negatives by the machine learning model 12 for data samples in each respective data slice. The data slice mosaic 430C shows a rate of false-positives by the machine learning model 12 for data samples in each respective data slice. The data slice mosaic 430D shows a rate of false-negatives by the machine learning model 12 for data samples in each respective data slice. Finally, the data slice mosaic 430E shows a rate of true-positives by the machine learning model 12 for data samples in each respective data slice. If there are no images in a particular data slice, the corresponding mosaic tile boundary is displayed, colored by the selected metric, in order to provide visual context to the user. Moreover, the data slice mosaics 430A-430E also visualize user-specified metrics, such as accuracy, confidence, and spuriousness probability, using the color of the mosaic tile boundaries, which provides a valuable guide to users in detecting troublesome slices. Users can easily annotate a slice by double-clicking a mosaic tile and selecting/inputting their annotations.

Finally, the graphical user interfaces 400A and 400B include a slice detail view 440. The slice detail view 440 displays image samples of a selected data slice, presenting either or both of the original images and their pixel attribution (GradCAM) heatmaps upon users' selection. In this way, users can see further details of each slice. Other slice metrics are also displayed in this view, such as the slice size and data distributions based on the confusion matrix.

Figure 6:
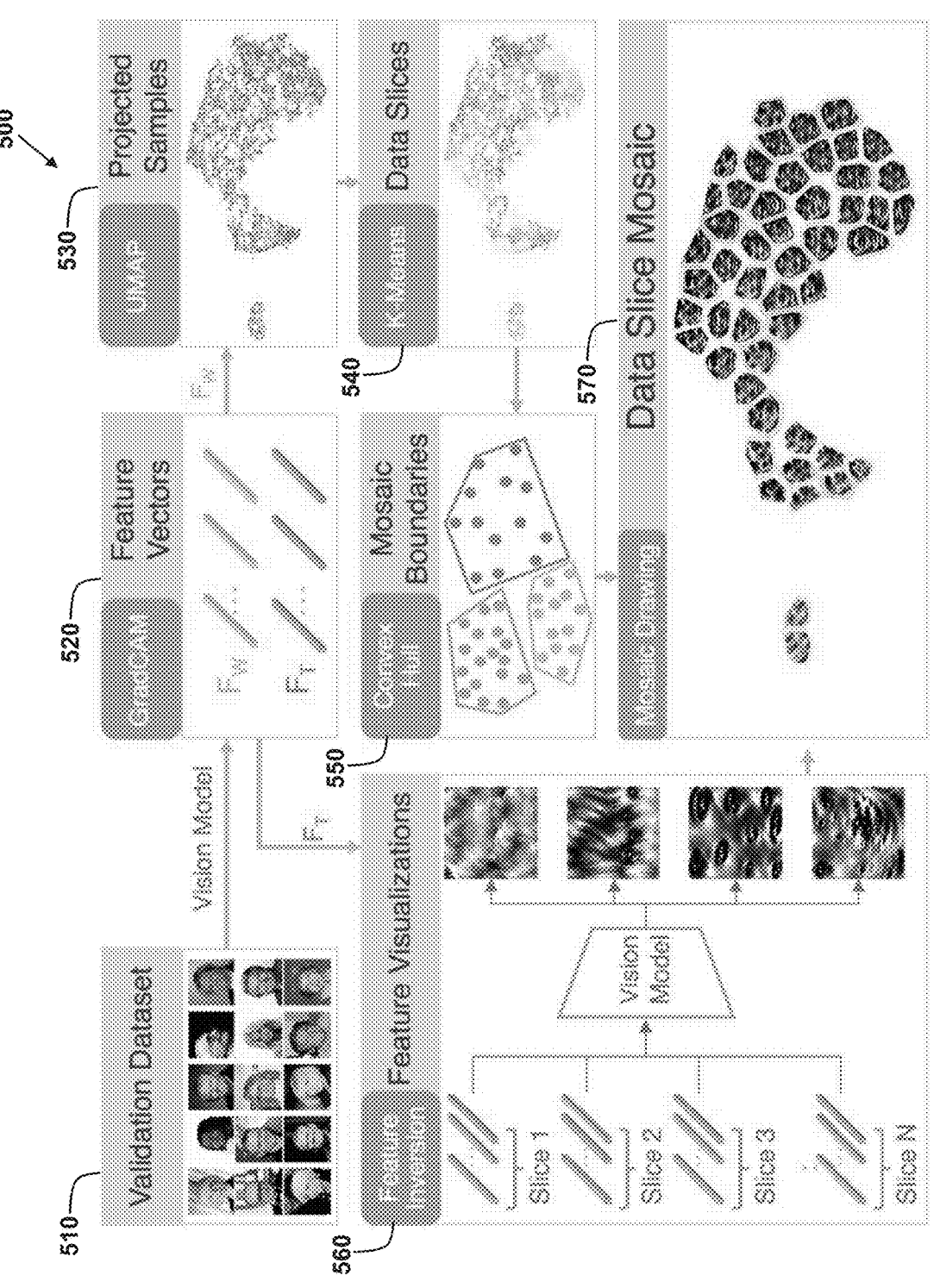

In at least some embodiments, the slice detail view 440 includes pixel attribution (GradCAM) heatmaps overlaid upon individual validation images. Particularly, the processor 110 generates the pixel attribution heatmap for a respective validation image by mapping the weight matrix W for the respective validation image to pixels of the respective validation image. The processor 110 displays, in the graphical user interface, the pixel attribution heatmap is overlaid upon the original validation image. In this way, the user can easily understand which features of the image are being relied upon by the machine learning model to classify the respective validation image FIG. 6 summarizes a workflow 500 for generating the data slices mosaics for a vision model. As discussed above, the processor 110 calculates (block 520) plurality of weighted feature vectors $F_W$ and plurality of top-attributed feature vectors $F_T$ for all images in a validation dataset 510, using GradCAM and the machine learning model 12. Next, as discussed above, the processor 110 maps (block 530) the plurality of weighted feature vectors $F_W$ to a two-dimensional space, e.g., using UMAP. Next, the processor 110 identifies (block 540) a plurality of data slices by clustering the mapped feature vectors $F_W$, e.g., using K-means.

Next, the processor 110 calculates (block 550) a respective convex hull for the mapped feature vectors $F_W$ of each data slice in the plurality of data slices. Particularly, to determine the boundaries of the mosaic tiles for of each data slice, the processor 110 calculates the convex hull of each slice in the 2D space. The convex hull is a boundary that best separates the mapped feature vectors $F_W$ in a cluster/data slice from the mapped feature vectors $F_W$ of each other cluster/data slice. Since the data slices are already clustered in the 2D space, the resulting convex hulls have almost no overlap with each other. This produces a layout of mosaic tiles that will allow for the positioning of every data slice summary (feature visualization) in the data slice mosaic without overlap.

Next, the processor 110 generates (block 560) a plurality of feature visualizations for the plurality of data slices. Feature visualization is an XAI technique that uses optimization to create images that produce a desired response in specific neurons, channels, or layers of a neural network. Each feature visualization is a visual representation of the features focused or relied upon by the machine learning model 12 for generating an output with respect to the validation data samples of the respective data slice.

The processor 110 determines each respective feature visualization using feature inversion. Feature inversion is a type of feature visualization and is particularly useful for understanding how a model processes visual information by generating images that best match a given representation. By optimizing random values using backpropagation to achieve the same activation as the target image, feature inversion produces an output that reveals how the network perceives the input image. To achieve this, feature inversion first runs the target image through the network and records the neuron activations at the desired layers. Then, it initializes a new image with random values and optimizes it using backpropagation to match the target activation. Formally, feature inversion is defined as finding a synthetic image x*, given a representation function $\phi:R^{W \times H \times C} \rightarrow R^d$ and a target feature activation $\phi(x) = \phi_0$.

$$x^* = \operatorname{argmax}_{x \in R^{W \times H \times C}}(l(\phi(x), \phi_0) + \lambda R(x))$$

where $(l(\phi(x), \phi_0) + \lambda R(x))$ is the loss function that captures the difference between $\phi(x)$ and $\phi_0$, and $R(x)$ is a regularization term.

In this way, the processor 110 uses feature inversion to generate a representative image that summarizes the content of multiple images in the data slice. The processor 110 determines a respective average of the top-attributed feature vector $F_T$ of the respective data slice and sets the target of the feature inversion optimization, $\phi_0$, to be of the top-attributed feature vector $F_T$ of the respective data slice, i.e., $$\phi_0 = \left(\sum_1^N F_T\right)/N.$$

Since the resulting image is one that approximates the top-attributed feature vectors, the resulting visualization will portray the most dominant visual patterns in a data slice that the model uses to make predictions.

In at least one embodiment, the feature inversion is performed with the added constraint that the generated feature visualization for each data slice has a shape corresponding to the convex hull of the respective data slice. In this way, no information is lost by cropping the feature visualization when overlaying it within the mosaic tile boundaries. To this end, the processor 110 performs the feature inversion with an additional constraint. After each iteration, the processor 110 sets the pixels of the resulting image that lay outside the convex hull boundary to 0, forcing the optimization process to focus on pixels that lay within the convex hull boundary.

Finally, once the feature visualizations are rendered, the processor 110 generates (block 570) the data slice mosaic by arranging the feature visualizations as a mosaic based on the clustered feature vectors $F_W$ and/or the convex hull for each data slice. Particularly, within the data slice mosaic, each feature visualization is overlaid upon the corresponding convex hull to form a mosaic tile. This visualization allows users to explore the relationships between data slices and identify the key visual patterns that distinguish them. Particularly, each mosaic tile has a feature visualization that helps the user to visualize the features of each data slice that the machine learning model 12 primarily utilizes to make predictions. Moreover, each mosaic tile is arranged in the 2D space of the data slice mosaic at a position that is representative of the features of each data slice, such that the similarity between data slices is easily understood based on the proximity of the mosaic tiles to one another.

As discussed above, the data slices mosaics can be displayed in a confusion matrix view. Particularly, in the confusion matrix view, the feature visualizations and mosaic tiles are arranged as four different mosaics, each of the four different mosaics representing a different one of (i) a rate of true-positives, (ii) a rate of true-negatives, (iii) a rate of false-positives, and (iv) a rate of false-negatives of the machine learning model 12 with respect to each data slice.

Particularly, if a data slice has samples with the respective confusion matrix category and/or error type, then the feature visualization is displayed with the feature visualization in the data slice mosaic. Otherwise, if the data slice does not have samples with the respective confusion matrix category and/or error type, then the feature visualization is not displayed within the mosaic tile and only the convex hull is displayed.

The method 200 continues with annotating slice errors (block 250). Particularly, based on user inputs received from a user, the processor 110 annotates at least one data slice from the plurality of data slices. Based on the at least one annotation to the at least one data slice, the processor 110 determines, a respective probability that the annotation applies to the validation data samples in each other data slice from the plurality of data slices, using a label propagation technique. Thus, each data slice in the plurality of data slices is provided either with a manual annotation from the user or propagated annotation probability. By leveraging the annotation probability, the amount of human effort required for annotating the validation data set is greatly reduced.

In at least some embodiments, each annotation comprises one of (1) a spurious feature label or (2) a core feature label. As eluded to above, a spurious feature label applied to a data slice denotes that spurious features were focused or relied upon by the machine learning model 12 to generate an output with respect to the validation data samples of that data slice. In other words, the machine learning model 12 correlates the wrong features with the output label. In the example of a hair color classification model, spurious features might include backgrounds, facial features, or any other features within an image that are not hair features. Conversely, a core feature label applied to a data slice denotes that core features were focused or relied upon by the machine learning model 12 to generate an output with respect to the validation data samples of that data slice. In other words, the machine learning model 12 correlates the correct features with the output label. In the example of a hair color classification model, core features would include hair features within an image. In at least some embodiments, some annotations may further comprise an incorrect labels label indicating that validation data samples within the data slice include incorrectly labeled validation data samples.

It should be appreciated that the graphical user interfaces 400A, 400B, in particular the data slice mosaics 430A-E, make it easy for a user to identify issues, such as spurious correlations, within the data slices. Spurious correlations can exist in any machine learning model regardless of accuracy, causing significant problems, including but not limited to poor generalization performance in production or AI fairness issues.

With reference again to FIGS. 5A and 5B, as the user navigates the graphical user interfaces 400A, 400B, the user may click a mosaic tile within the data slice mosaic 430A-E to annotate the corresponding data slice with an annotation/label. In response to such a selection of a mosaic tile, the processor 110 displays an annotation window 450 within the graphical user interface 400A, 400B. The user can interact with the annotation window 450 to apply a spurious feature label or a core feature label. Additionally, the user can apply a descriptive label to further categorize the data slices (e.g., "core: gray hair," "Spur: mouth," or "Wrong labels").

Once at least one data slice has been annotated with a spurious features label or a core features label, the processor 110 determines spuriousness probabilities for each other data slice that was not annotated with a spurious features label or a core features label. The so-called "spuriousness probabilities" are values ranging from 0 to 1 indicating a probability that the machine learning model 12 focused or relied upon spurious features to generate an output with respect to the validation data samples of that data slice. Thus, a spuriousness probability that is near 0 indicates that the machine learning model 12 likely used core features for the data slice, whereas a spuriousness probability that is near 1 indicates that the machine learning model 12 likely used spurious features for the data slice.

The processor 110 calculates the spuriousness probabilities for each data slice that was not annotated using a label propagation method, such as the scikit-learn method, which automatically generates this probability for unannotated data slices based on the users' annotation and the similarities of the data slices' feature representations. Particularly, in some embodiments, the processor 110 determines a feature representation for each data slice as an average of the weighted feature vectors $F_W$ for validation data samples in the data slice. Next, the processor 110 calculates the spuriousness probabilities for each data slice that was not annotated based on similarities (e.g., distances) between the feature representation of the unannotated data slice and the feature representations of the annotated data slices.

With reference again to FIGS. 5A and 5B, the spuriousness probabilities are displayed to the user within the graphical user interfaces 400A, 400B. Firstly, the slice table 420 allows the user to sort the data slices by the spuriousness probabilities. Additionally, the outline or convex hull of each mosaic tile in the data slice mosaics 430A-E are color coded depending on the spuriousness probabilities. In this way, the spuriousness probabilities enable an easier data slice exploration process, due to slices with hypothetical spurious correlations being highlighted. This is an important step to assist users in detecting and evaluating problematic slices.

The method 200 continues with retraining the machine learning model to mitigate reliance on spurious features (block 260). Particularly, one effective approach to mitigating spurious correlations in the machine learning model 12 is through model retraining, which can improve the model's robustness against potential bias without changing the architecture. As discussed above, in addition to the plurality of validation data samples, the dataset 170 also includes a plurality of training data samples that were used to train the machine learning model 12. Based on the manual spuriousness annotations and the calculated spuriousness probabilities, the processor 110 modifies one or more training data samples in the plurality of training data samples in a manner designed to prevent the machine learning model 12 from erroneously learning to rely on spurious features to generate an output on those training data samples. Once the plurality of training data samples are modified as needed, the processor 110 retrains the machine learning model 12 using the modified plurality of training data samples.

In order to identify which training data samples should be modified, the processor 110 identifies which data slices of the plurality of data slices have a spurious features label or have a spurious probability that exceeds a predetermined threshold, i.e., data slices corresponding to a significant reliance on spurious features by the machine learning model 12. Next, the processor 110 identifies training data samples that correspond to or are similar to the identified data slices of the validation data samples. In one embodiment, the processor 110 determines weighted feature vectors for the plurality of training data samples in the same manner as was used to determine the plurality of weighted feature vectors $F_W$ for the plurality of validation data samples. Next, the processor 110 determines which data slice each training data sample belongs to by mapping the respective weighted feature vectors to the clusters of weighted feature vectors $F_W$ for the data slices. Once a set of training data samples are identified for modification, the processor 110 modifies those training data samples in a manner designed to prevent the machine learning model 12 from erroneously learning to rely on spurious features to generate an output on those training data samples. In at least some embodiments, in addition to modifying training data to reduce reliance on spurious features, the processor 110 also re-labels some training data if it has been identified as having incorrect labels.

In the case of a vision model trained using training images, in some embodiments, the Core Risk Minimization (CoRM) method is leveraged to reduce the model's reliance on spurious features. CoRM corrupts non-core image regions with random Gaussian noise and retrains the model using the noise-corrupted data, which has been shown to be effective in mitigating a model's reliance on spurious features. Particularly, the processor 110 applies noise to portions of the identified training images that correspond to the spurious features and retrains the machine learning model 12 using the noise-corrupted training images.

Figure 7:
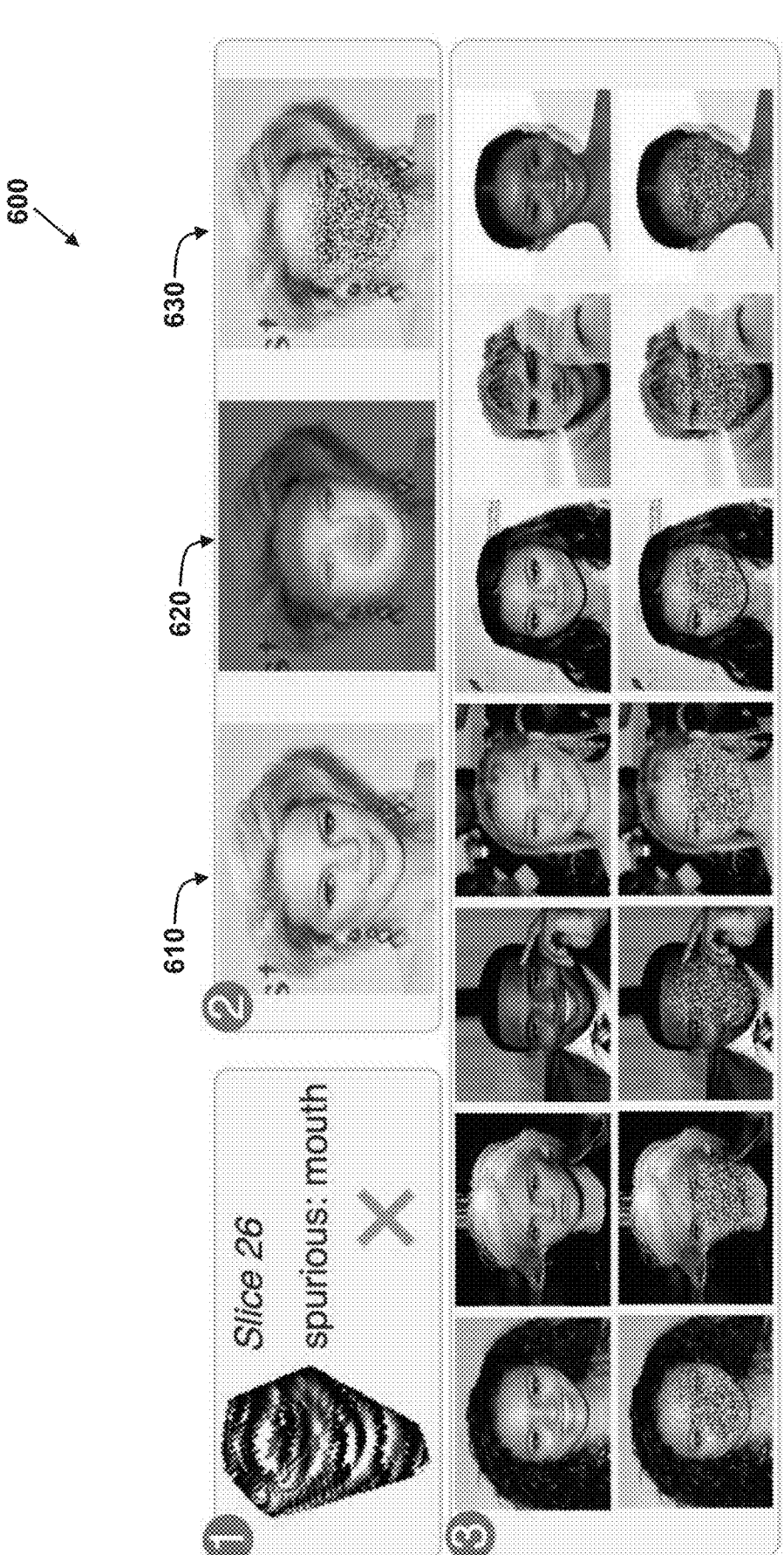
FIG. 7 summarizes an exemplary workflow for noise-corrupting spurious features in training images.

FIG. 7 summarizes an exemplary workflow 600 for noise-corrupting spurious features in training images. For the training images corresponding to the problematic data slices, the pixel attributions (i.e., GradCAM masks or heatmaps 620) are used to highlight spurious regions and these masks are used to add random Gaussian noise to spurious regions. Particularly, the processor 110 determines a weight matrix for each training image 610 to be modified, in a similar manner as discussed above with respect to determining the weight matrices W. The processor 110 maps the weight matrix to the pixels of the training image, using the Grad-CAM method, to determine a GradCAM mask m. Finally, the processor 110 applies Gaussian noise to the training image using the mask m to provide a noise-corrupted training image 630. For a single image, this process can be represented by $x'=x+m\odot z$, where x is the input image, m is the GradCAM mask, and z is the generated Gaussian noise matrix. All these three variables are of the same size as the input image, and $\odot$ denotes the Hadammard product. FIG. 7 shows some examples of this operation, with exaggerated noise for presentation purposes.

After replacing the original training data samples with the modified training data samples (e.g., noise-corrupted images), the processor 110 retrains the machine learning model 12, which should result in a trained machine learning model 12 that has a reduced reliance on spurious features and provides better generalization performance.

Illustrative Case Studies

In an effort to illustrate how insights from the method 200 can be used to improve a machine learning model, two case studies are discussed. These case studies utilize vision models trained upon publicly available vision datasets to benchmark and evaluate the capabilities of the method 200. The primary objective of these case studies is to showcase how the method 200 empowers machine learning experts and practitioners to detect, evaluate, and interpret potential issues in vision models.

Figure 8:
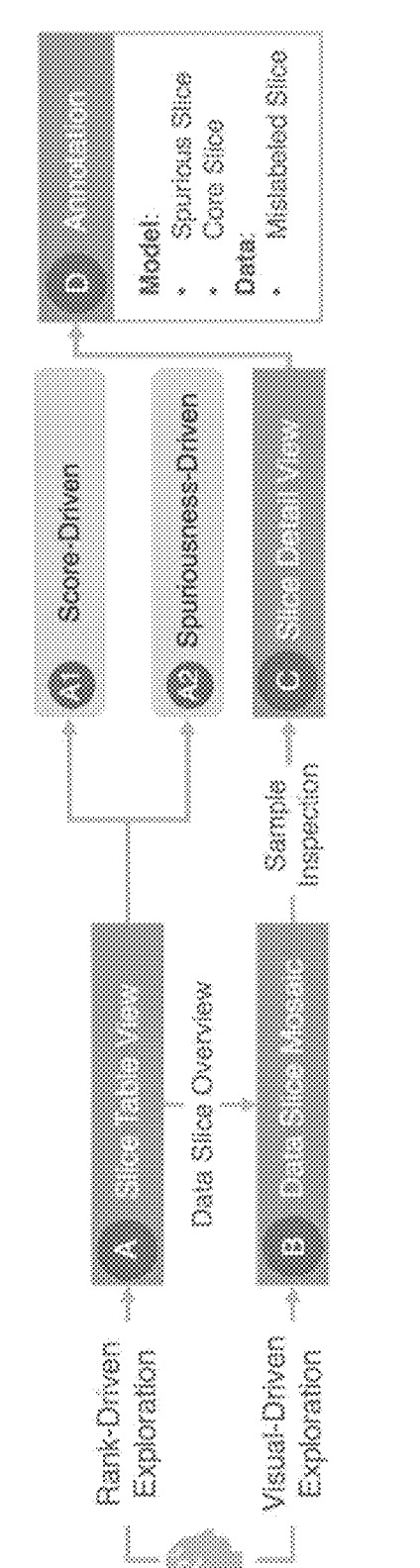
FIG. 8 illustrates common usage patterns of the system and method.

FIG. 8 illustrates common usage patterns 700 of the system and method. Particularly, users can begin the analysis with a rank-driven evaluation using the slice table of the graphical user interfaces, in which the data slices are ranked by score (e.g., model accuracy or Spuriousness), or with a visual-driven evaluation using the data slice mosaic of the graphical user interfaces. Once a data slice of interest is identified, individual validation data samples can be explored in the slice detail view of the graphical user interfaces. Finally, the user can annotate the data slices and continue their analysis.

In a first case study, the method 200 is applied to a hair color classification model to find edge cases in the dataset. This case study is the illustrative example previously used with respect to the preceding FIGS. 1, 4, 5A, 5B, and 6. This case study involves the Large-scale CelebFaces Attributes (CelebA) dataset with 202,599 face images. The label of each image is one of the classes {not gray hair, gray hair}, referred to as labels {0,1}, respectively. With training, validation, and test splits of 8:1:1, transfer learning was adopted to train a ResNet50 binary image classifier. After iteratively fine-tuning hyper-parameters, a trained model was obtained with 98.03% classification accuracy. The method 200 was leveraged by experts to explain and trouble-shoot the performance of this hair color classifier, with the settings: n_neighbors=5, min_dist=0.01, and n_components=2 for the UMAP algorithm, and n_clusters=50 for the K-Means clustering.

Does the model behave correctly on well-performing slices? One basic expected behavior for a hair color classification model is to catch hair features. With reference again to FIG. 5A, at first glance of the data slice mosaic 430C, the experts noticed that slice_22 and slice_5 on the left, lie separately from others on the Data Slice Mosaic. Their feature visualizations are suggestive of gray hair patterns, which means the model uses the correct features, i.e., core features. By verifying the corresponding pixel attributions using the slice detail view 440, they confirmed the correctness of this insight and annotate both data slices as a core feature with the description "Core: gray hair." Upon experts saving the annotation, the method 200 automatically propagates the annotation and provides a spuriousness probability of each slice in the graphical user interface 400A. With this guidance, the experts observed that many slices lying on the right side of data slice mosaic 430A have higher spuriousness probabilities. Moreover, their feature visualizations are not suggestive of hair patterns. Instead, many of the feature visualizations appear to include other facial features such as eyes and mouths, leading to valid doubts that the model does not behave correctly on such slices. Additionally, the experts also noticed that the model has correct predictions on these slices (with 100% prediction accuracy). This gave reason for the experts to worry that the model is largely biased by spurious features.

Figure 9:
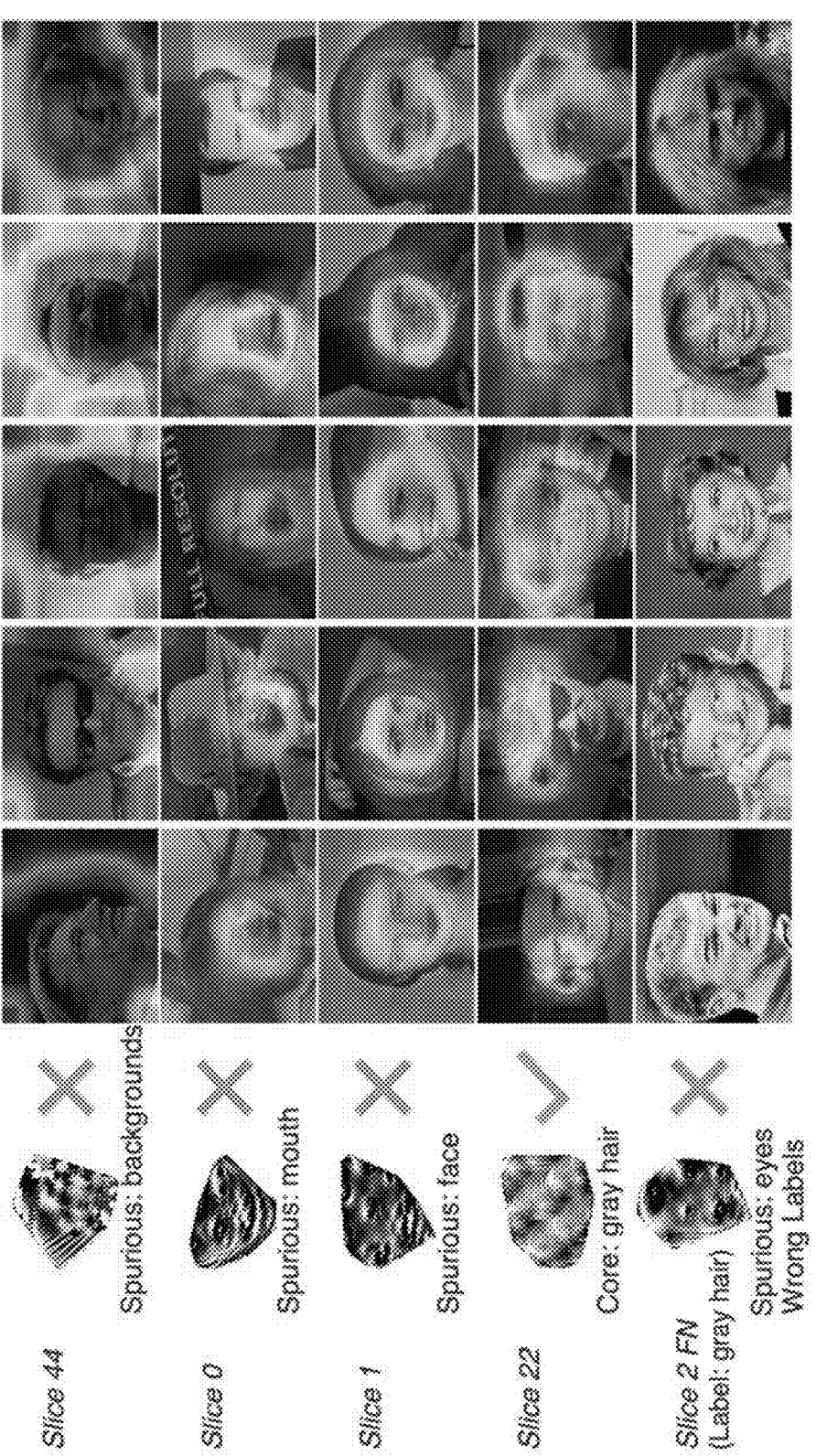
FIG. 9 shows some exemplary spuriousness issues that were detected in the operation of the hair color classifier model.

FIG. 9 shows some exemplary spuriousness issues 800 that were detected in the operation of the hair color classifier model. Particularly, through investigation, the experts found that the model mistakenly utilizes mouths and eyes to predict hair color for several of the top-performing slices, such as slice_0, slice_1, and slice_2. As can be seen in the heatmaps 800, the model focuses on spurious correlations relating to image backgrounds, mouths, faces, and eyes. Additionally, some image samples were identified having incorrect labels.

Why do some slices underperform? The experts were also eager to investigate the underperforming data slices. With reference again to FIG. 5A, by sorting the slice table 420 by ascending order of accuracy, they noticed that the model only achieves 72.41% accuracy on slice_44 and found that the feature visualization of this slice only shows non-meaningful colorful patterns. After checking the pixel attributions, they found the model looks at image backgrounds to make predictions, which can be seen in the heatmaps 800 of FIG. 9. This spurious correlation issue stands out, and they annotated this slice as "spurious" with the description "Spurious: backgrounds". Similar issues also occurred in its neighborhood slices, and the method 200 automatically assigns them with higher spuriousness probability.

What underlying factors contribute to unexpected behaviors? The machine learning experts were interested in understanding why such unexpected model behaviors happen. With reference again to FIG. 5A, by sorting the slice table 420 by descending order of spuriousness, they got a list of slices with high spuriousness possibilities. They switched data slice mosaic into the confusion matrix form, shown in FIG. 5B, to study further details. By clicking on the name of "slice_35", they highlighted this slice on the four data slice mosaic sub-views 430B-E and inspected the provided explanations, where they noticed that images that lie in the "False Negative" group of this slice have the wrong labels-they should be labeled as "not gray hair" rather than "gray hair". They marked this issue as 'wrong labels.' By investigating its neighborhood slices, they found and mark another slice with wrong labels through a few clicks, slice_2_FN.

In summary, through the aforementioned procedure in this case study, it is demonstrated how the method 200 supports users in uncovering and interpreting potential model issues with visual summaries and helpful guidance. Based on annotations from machine learning experts, the method 200 employs the CoRM framework to mitigate the detected errors, which will be evaluated below.

In a second case study, the method 200 is applied to a bird category classification model to detect bias. Particularly, to study whether the method 200 can help machine learning experts and practitioners find the potential biases and discrimination of models, this case study was designed with a biased dataset called Waterbirds, which is constructed by cropping out birds from photos in the Caltech-UCSD Birds-200-2011 (CUB) dataset and transferring them onto backgrounds from the Places dataset. For each image, the label belongs to one of {waterbird, landbird}, and the image background belongs to one of {water background, land background}. The training set is skewed by placing 95% of waterbirds (landbirds) against a water (land) background and the remaining 5% against a land (water) background. The training, validation, and test sets included 4795, 1199, and 5794 images, respectively. After training and fine-tuning hyper-parameters, the waterbirds/landbirds classification model achieved 85.74% classification accuracy. In the data slice finding, n_neighbors=20, min_dist=0.05, and n_components=2 were set for the UMAP algorithm, and n_clusters=50 was set for K-Means.

While in this study, machine learning experts were aware that the model is likely biased by backgrounds, i.e., using water backgrounds to classify waterbirds and vice versa for landbirds. However, such priori knowledge is hard to establish in real-world applications because of the scarcity of additional well-labeled metadata. Hence, the experts assumed that such information is unknown and wanted to validate whether the method 200 can make the potential model biases stand out by only utilizing the original images and the trained model.

Figure 10A:
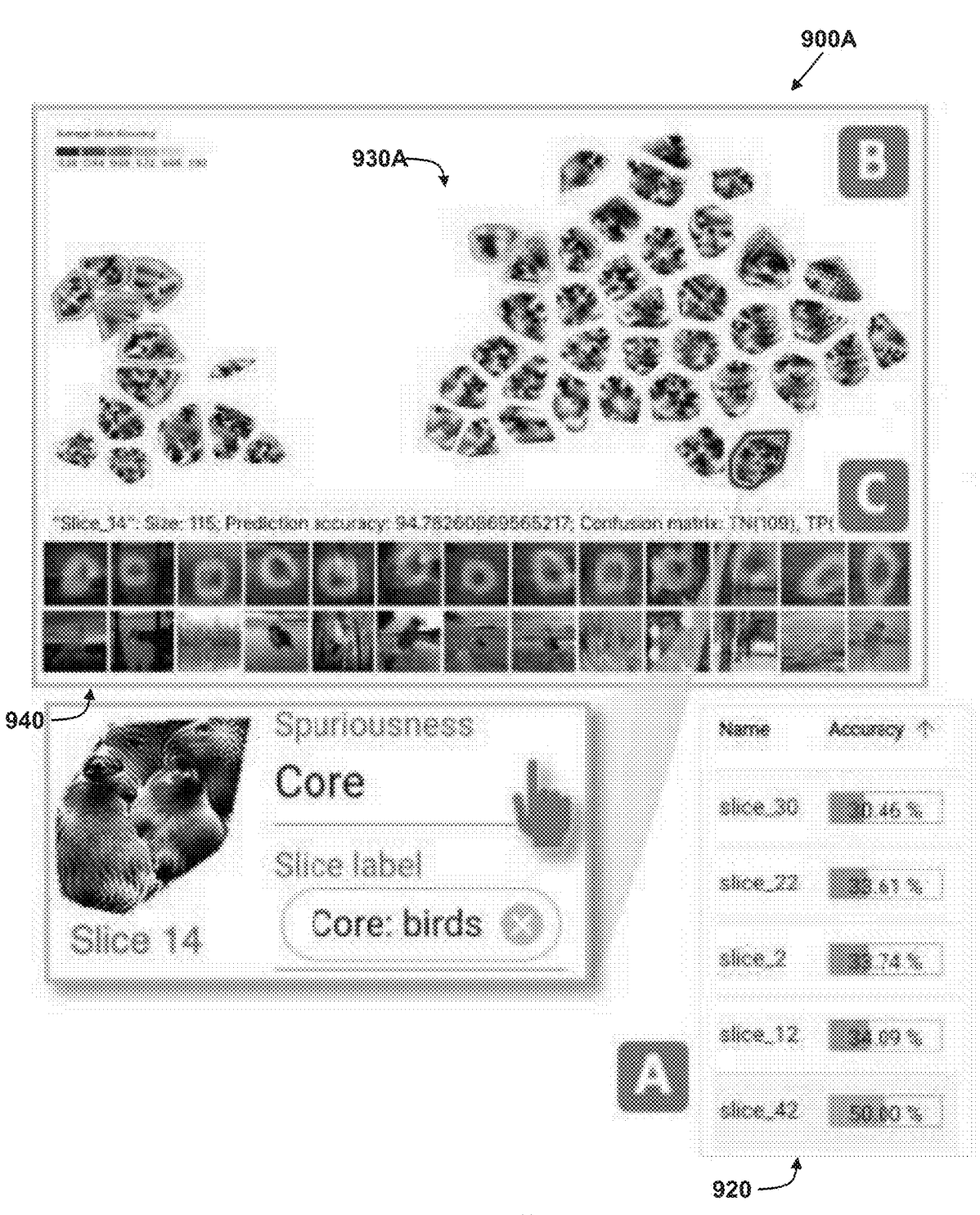
FIGS. 10A and 10B show further exemplary graphical user interfaces for visually analyzing data slices.
Figure 10B:
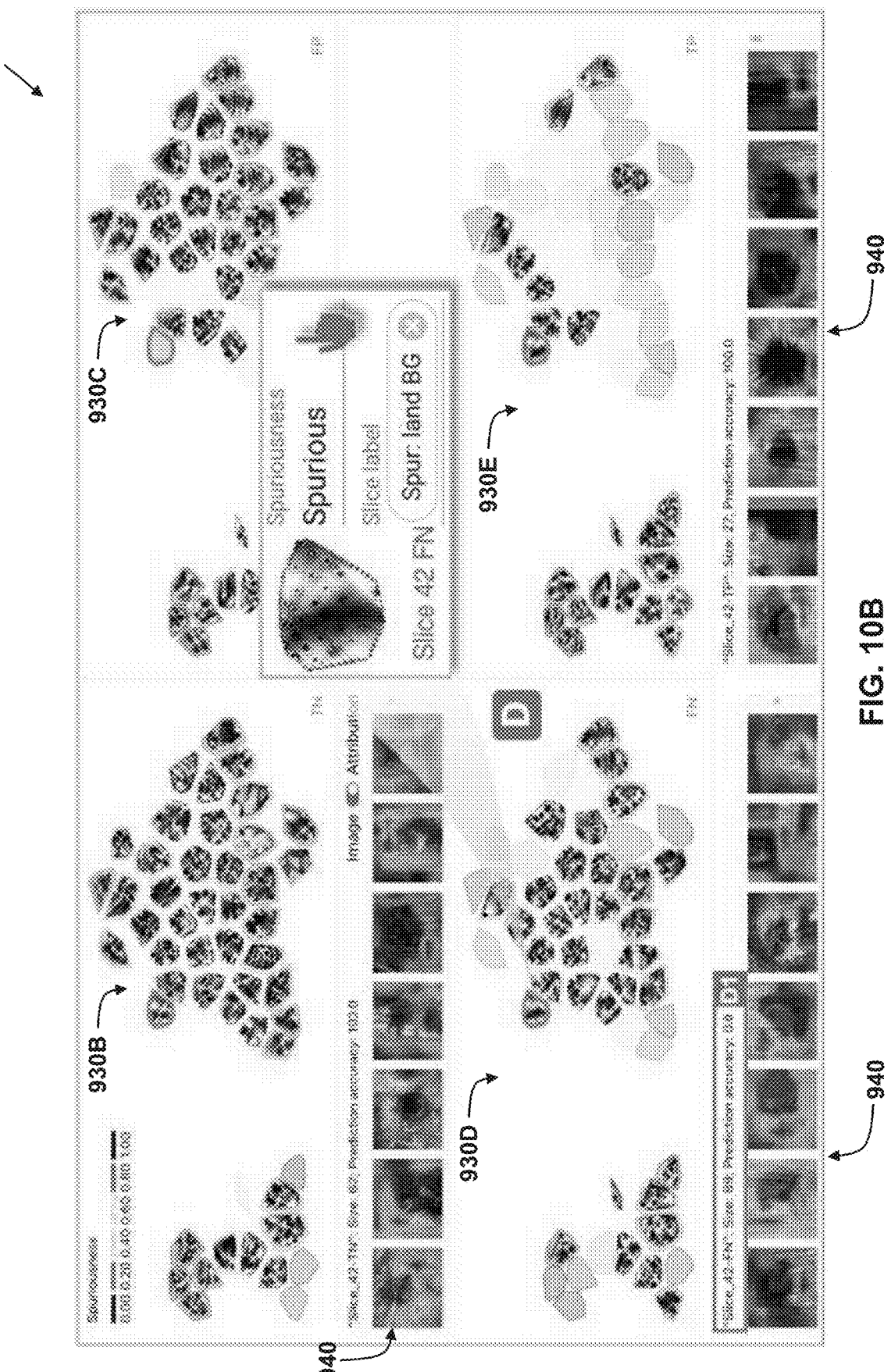

FIGS. 10A and 10B show further exemplary graphical user interfaces 900A, 900B for visually analyzing data slices. The graphical user interfaces 900A, 900B are essentially similar to the graphical user interfaces 400A, 400B illustrated in FIGS. 5A and 5B, except that the method 200 is applied to validate the bird category classification model. Using the data slice mosaic 930A, the experts found the correct model behavior (bird patterns) corresponding to a well-performed Slice 14 and annotated it as "core: birds."

By switching to the confusion matrix view and viewing data slice mosaics 930B-E, the experts investigated the underperforming slices with accuracy sorting via the slice table 920. The experts identified a problematic slice_42 that has high false negatives, which turned out to use the spurious feature of land backgrounds (BG) to predict landbirds.

Figure 11:
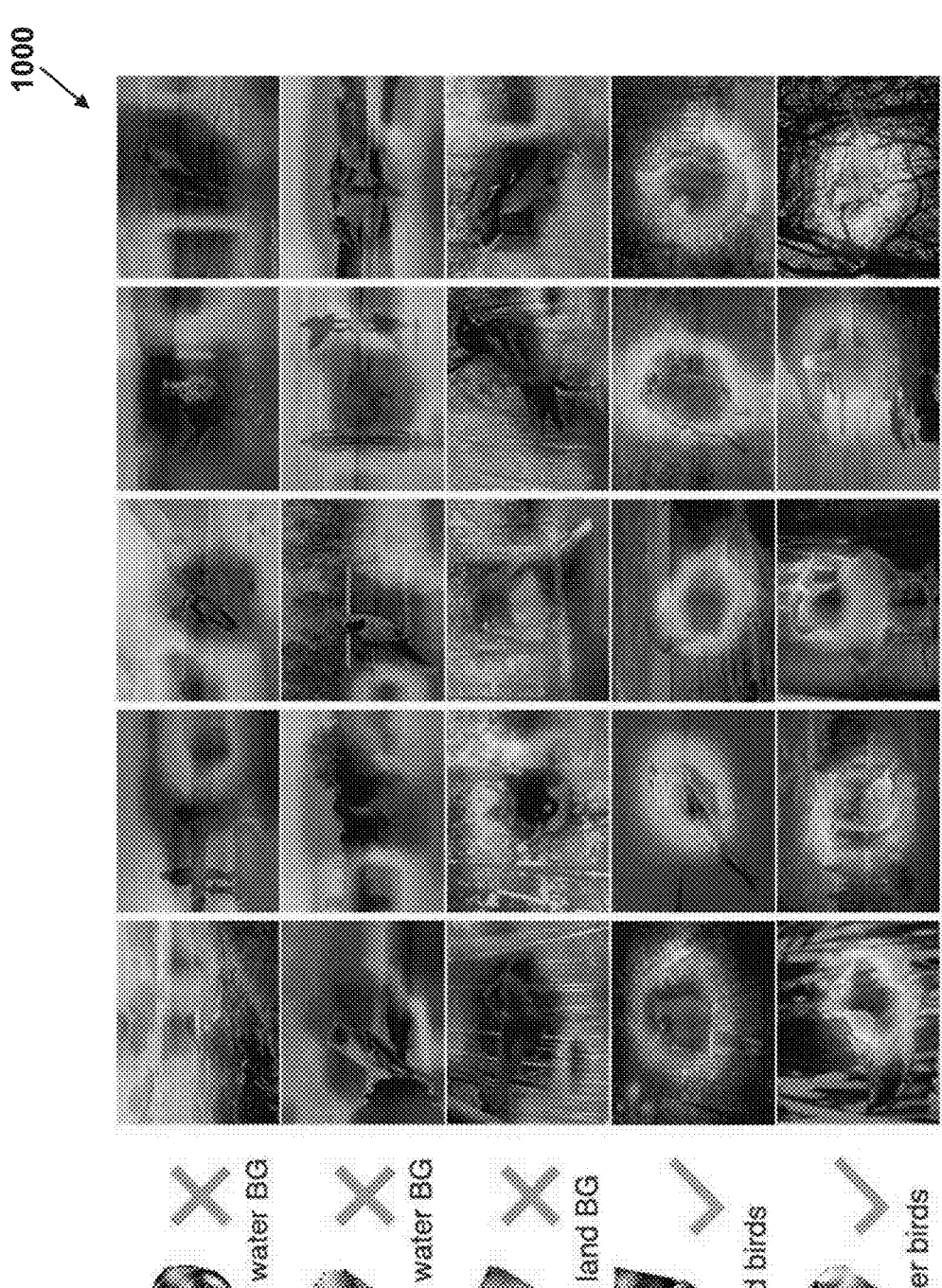
FIG. 11 shows some exemplary spuriousness issues that were detected in the operation of the bird category classifier model.

Does the model exhibit bias? To answer this key question, the experts started by finding and investigating the underperforming slices. From the slice table 920, they sorted the listed slices by ascending order of accuracy and selected the worst-performed slice_30. FIG. 11 shows some exemplary spuriousness issues 1000 that were detected in the operation of the bird category classifier model. Particularly, the coordinated information provided by feature visualization and pixel attributions highlighted a spurious correlation problem in which the model erroneously used water and land backgrounds to classify birds. The experts annotated this slice as using spurious features, water backgrounds, and the method 200 automatically propagated this annotation. They verified the propagation correctness on neighborhood slices and also annotated the slice_2 as using the same spurious features. Moreover, the experts identified an underperforming slice_42 that was not clustered with the others and was given a high spuriousness probability. They investigated this slice and verified that the model utilizes spurious features, land backgrounds, to predict bird classes in this slice. With reference to FIG. 10B, through the data slice mosaics 930B-E in the confusion matrix view, the experts found that such spurious correlations result in many false negatives, where the model uses land backgrounds to mistakenly predict many "waterbirds" as "landbirds".

Is the detected bias prevalent across all slices? Why or why not? Machine learning experts were interested in determining whether the detected bias was pervasive throughout the dataset. With reference to FIG. 10A, by analyzing slices that are distant from the annotated ones in the data slice mosaic 930A and are assigned with low spuriousness possibilities, the experts discovered that the farthest neighbors, namely slice_24 and slice_14, corresponded to core features. This suggests that the model can correctly capture bird regions in these slices, which raises a follow-up "why" question. To understand in what circumstances the model fails, the experts browsed the original images from slice_42 (spurious feature) and slice_14 (core feature), respectively, using the detail view 940. They found that slice_42 had very similar land backgrounds and very different birds, while on the other hand, the birds' appearance in slice_14 (core feature) is very consistent. This finding explains why this biased model can still capture the core features from slice_14-greater similarities of core features in the representation space leads to greater robustness against spurious correlations. Such insights are helpful in improving model robustness and have been further studied by machine learning experts. In summary, the method 200 enables the machine learning experts to validate the existence of model biases and extract slices corresponding to different biases.

Evaluation

The method 200 was also quantitatively and qualitatively evaluated with the two case studies, demonstrating its effectiveness in model validation for vision tasks. The method 200 can help researchers and practitioners to better understand and mitigate edge cases in vision applications, ultimately leading to more reliable and accurate machine learning models. Both quantitative and qualitative evaluations were conducted to validate whether the method 200 can indeed leverage human insights to enhance vision models' performance while reducing their reliance on spurious features.

The quantitative evaluation involved four matrices including: clean accuracy, core accuracy, spurious accuracy, and relative core sensitivity. Clean Accuracy is a model accuracy calculated on the original dataset, where larger values are indicative of better overall accuracy. Core Accuracy, $acc^{(c)}$, is a model accuracy calculated when spurious regions are masked with Gaussian noise, where larger values are indicative of the model's greater reliance on core regions. Spurious Accuracy, $acc^{(s)}$, is a model accuracy calculated when core regions are masked with Gaussian noise, where larger values are indicative of the model's greater reliance on spurious regions. RCS is a metric quantifying the model's reliance on core features while controlling for general noise robustness. RCS is defined as the ratio of the absolute gap between core and spurious accuracy, and the total possible gap for any model between core and spurious accuracy, and is represented as $$RCS = \frac{acc^{(C)} - acc^{(S)}}{2 \times \min(\alpha, 1 - \alpha)},$$

where $$\alpha = \frac{acc^{(C)} - acc^{(S)}}{2}.$$

RCS ranges from 0 to 1, where a higher value is indicative of better model performance.

In the two case studies discussed above, machine learning experts annotated five spurious slices in the CelebA dataset, {slice_0, slice_1, slice_2, slice_44, slice_26}, and six spurious slices in the Waterbirds dataset, {slice_30, slice_2, slice_22, slice_12, slice_42, slice_9}, respectively. For each case study, the method 200 automatically ran the label propagation algorithm and exported both the users' annotation records and the propagated spuriousness probabilities for further investigation.

To thoroughly evaluate the method 200, three models were evaluated for each case. The models marked as "baseline" are the original trained models obtained at the beginning of each case study. The models marked as "AS" are re-trained using the CoRM method after adding noise to "spurious" slices according to results exported from the method 200. In particular, "Annotation" indicates that only user-annotated spurious slices were corrupted with noise, while "Propagation" indicates that propagated Spuriousness is used to identify spurious slices to be modified with noise.

FIG. 12 shows a table 1100 summarizing the quantitative evaluation of the overall performance and reliance on spurious features for the hair color classification models trained on the original CelebA dataset and the modified CelebA dataset improved using the method 200. Performance was evaluated with the validation set.

FIG. 13 shows a table 1200 summarizing the quantitative evaluation of the overall performance and reliance on spurious features for the bird category classification models trained on the original Waterbirds dataset and the modified Waterbirds dataset improved using the method 200. Performance is evaluated with the validation set.

As can be seen, the method 200 can significantly improve the vision model's overall performance with reduced spurious correlations. Furthermore, the label propagation of the method 200 significantly reduces human effort by automating the annotation process, and achieves the best performance in this quantified evaluation. Overall, the results demonstrate that the method 200 is effective for mitigating spurious correlations in machine learning models, and the label propagation algorithm is a valuable tool for automating the annotation process.

Figure 14:
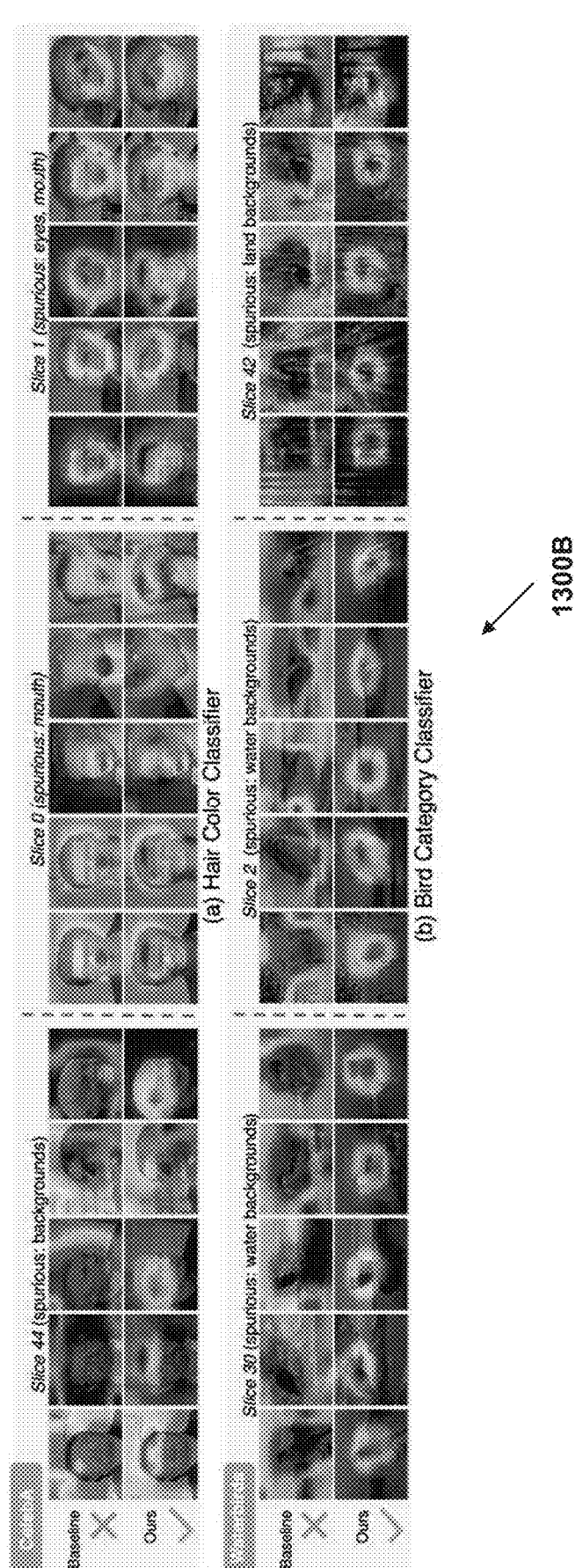
FIG. 14 shows a qualitative evaluation with the pixel attribution from GradCAM.

To qualitatively evaluate the results, the models' attributions were compared using GradCAM. FIG. 14 shows a qualitative evaluation with the pixel attribution from Grad-CAM. In the summary 1300A, the original classification model and the improved model were visually compared for hair color classification on the CelebA dataset. In In the summary 1300B, the original classification model and the improved model were visually compared for bird category classification on the Waterbirds dataset. For each sub-figure, the first row refers to the original model, and the second row refers to the improved model. As can be seen, the retrained and improved models suppress the spurious correlations by using the correct features for predictions.

The hair color classification model originally has spurious correlations dominant in {slice_44, slice_0, and slice_1}, where the model uses image backgrounds, mouth, or eyes to predict hair color, respectively. With the help of the method 200, the model was successfully retrained to focus on the correct hair regions, as shown in the summary 1300A of FIG. 14. As for the bird category classification model, it originally focuses on spurious features, such as water/land backgrounds, to decide whether there are water/land birds on the input image {slice_30, slice_2, and slice_42}. As shown in the summary 1300B of FIG. 14, the method 200 mitigates these issues by helping the model to focus on the core bird features.

Embodiments within the scope of the disclosure may also include non-transitory computer-readable storage media or machine-readable medium for carrying or having computer-executable instructions (also referred to as program instructions) or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for validating a vision model, the vision model being a neural network having a plurality of layers, the vision model being configured to receive an input image and provide at least one output label, the method comprising:

storing, in a memory, a plurality of validation images;

determining, with a processor, using the vision model, a plurality of first feature vectors including a respective first feature vector for each respective validation image in the plurality of validation images, the respective first feature vector for each respective validation image being determined by (i) inputting the respective validation image into the vision model, (ii) extracting a respective intermediate output of at least one intermediate layer of the plurality of layers of the vision model, (iii) determining a weight matrix based on model gradients of the vision model at at least one intermediate layer, and (iv) determining the respective first feature vector based on the weight matrix;

identifying, with the processor, a plurality of groups of validation images from the plurality of validation images, based on the plurality of first feature vectors; and generating a pixel attribution heatmap for a respective validation image in the plurality of validation images by mapping the weight matrix for the respective validation image to pixels of the respective validation image; and displaying, on a display screen, a visualization of at least one group of validation images from the plurality of groups of validation images, the visualization including the pixel attribution heatmap overlaid upon the respective validation image.

2. The method of claim 1, the determining the respective first feature vector for each respective validation image further comprising:

determining the respective first feature vector by determining a weighted average of the respective intermediate output along at least one dimension using the weight matrix.

3. The method of claim 1, the identifying the plurality of groups of validation images further comprising:

clustering the plurality of first feature vectors; and forming each respective group of validation images from those validation images corresponding to a respective group of first feature vectors in the plurality of first feature vectors that are clustered together.

4. The method of claim 2 further comprising:

determining, with the processor, a plurality of second feature vectors including a respective second feature vector for each respective validation image in the plurality of validation images, by determining maximum weighted values in the respective intermediate output along at least one dimension using the weight matrix.

5. The method of claim 4, the displaying the visualization of the at least one group of validation images further comprising:

generating, using the vision model, a respective visualization of a respective group of validation images based on a respective group of second feature vectors from the plurality of second feature vectors that correspond to the respective group of validation images.

6. The method of claim 5, the generating the respective visualization of the respective group of validation images further comprising:

determining a respective average second feature vector for the respective group of validation images by averaging the group of second feature vectors from the plurality of second feature vectors that correspond to the respective group of validation images; and generating, based on the average second feature vector, a representative image as the respective visualization, the representative image being generated using the vision model via a feature inversion technique.

7. The method of claim 1, the displaying the visualization of the at least one group of validation images further comprising:

mapping the plurality of first feature vectors onto a two-dimensional plane;

generating a plurality of visualizations, each respective visualization in the plurality of visualizations representing a respective group of validation images in the plurality of groups of validation images; and displaying, on the display screen, the plurality of visualizations arranged as a mosaic in which each respective visualization is arranged with respect to other visualizations depending on the mapping of the plurality of first feature vectors onto the two-dimensional plane.

8. The method of claim 7, wherein each respective visualization in the plurality of visualizations has a shape and position in the mosaic corresponding to a convex hull of a clustering on the two-dimensional plane of respective first feature vectors in the plurality of first feature vectors that correspond to the respective group of validation images represented by the respective visualization.

9. The method of claim 7, the displaying the plurality of visualizations arranged as a mosaic further comprising:

displaying, on the display screen, the plurality of visualizations arranged as four different mosaics, each of the four different mosaics representing a different one of (i) a rate of true-positives, (ii) a rate of true-negatives, (iii) a rate of false-positives, and (iv) a rate of false-negatives of the vision model with respect to each group of validation images in the plurality of groups of validation images.

10. The method of claim 1 further comprising:

annotating, with at least one annotation, based on user inputs, at least one respective group of validation images from the plurality of groups of validation images; and determining, based on at least one annotation, a respective probability that the at least one annotation applies to images in each respective group of validation images in the plurality of groups of validation images.

11. The method of claim 10, wherein the at least one annotation indicates that spurious features are erroneously used by the vision model to determine the at least one output label for images in the at least one respective group of validation images.

12. The method of claim 10 further comprising:

storing, in the memory, a plurality of training images that were used to train the vision model;

modifying, with the processor, training images in the plurality of training images based on the at least one annotation and the respective probabilities that the at least one annotation applies to each of the plurality of groups of validation images; and retraining, with the processor, the vision model using the modified plurality of training images.

13. The method of claim 12, the modifying training images in the plurality of training images further comprising:

identifying groups of validation images in the plurality of validation images for which the respective probability that the at least one annotation applies exceeds a predetermined threshold;

identifying training images in the plurality of training images to be modified depending on the identified groups of validation images; and applying noise to portions of the identified training images in the plurality of training images.

14. The method of claim 13, the identifying training images in the plurality of training images to be modified further comprising:

determining, for each respective training image in the plurality of training images, a respective feature vector; and identifying, for each respective training image in the plurality of training images, that the respective training image is to be modified in response to determining that the respective feature vector maps to a cluster of first feature vectors of the plurality of first feature vectors corresponding to one of the identified groups of validation images in the plurality of validation images.

15. The method of claim 14, wherein the vision model is a neural network having a plurality of layers, the applying noise to the portions of the identified training images further comprising:

determining, for each respective training image to be modified, a weight matrix based on model gradients of the vision model at at least one intermediate layer;

mapping, for each respective training image to be modified, the weight matrix to pixels of the respective training image; and applying, for each respective training image to be modified, noise to the pixels of the respective training image depending on the mapping of the weight matrix.

16. The method of claim 12 further comprising:

relabeling at least one training image in the plurality of training images.

17. A method for validating a machine learning model, the machine learning model being configured to receive an input data sample and provide at least one output label, the method comprising:

storing, in a memory, a plurality of validation data samples;

determining, with a processor, using the machine learning model, a plurality of first feature vectors including a respective first feature vector for each respective validation data sample in the plurality of validation data samples;

identifying, with the processor, a plurality of groups of validation data samples from the plurality of validation data samples, based on the plurality of first feature vectors; and displaying, on a display screen, a visualization of at least one group of validation data samples from the plurality of groups of validation data samples, the displaying including (i) mapping the plurality of first feature vectors onto a two-dimensional plane, (ii) generating a plurality of visualizations, each respective visualization in the plurality of visualizations representing a respective group of validation images in the plurality of groups of validation images, and displaying, on the display screen, the plurality of visualizations arranged as a mosaic in which each respective visualization is arranged with respect to other visualizations depending on the mapping of the plurality of first feature vectors onto the two-dimensional plane, wherein each respective visualization in the plurality of visualizations has a shape and position in the mosaic corresponding to a convex hull of a clustering on the two-dimensional plane of respective first feature vectors in the plurality of first feature vectors that correspond to the respective group of validation images represented by the respective visualization.

18. A system for validating a machine learning model, the machine learning model being configured to receive an input data sample and provide at least one output label, the system comprising:

a display screen configured to display a graphical user interface;

at least one memory configured to store program instructions of the machine learning model, a plurality of validation data samples, and a plurality of training data samples; and at least one processor configured to:

determine, using the machine learning model, a plurality of first feature vectors including a respective first feature vector for each respective validation data sample in the plurality of validation data samples;

identify a plurality of groups of validation data samples from the plurality of validation data samples; and display, within the graphical user interface, a visualization of at least one group of validation data samples from the plurality of groups of validation data samples, the displaying including (i) mapping the plurality of first feature vectors onto a two-dimensional plane, (ii) generating a plurality of visualizations, each respective visualization in the plurality of visualizations representing a respective group of validation images in the plurality of groups of validation images, and (iii) displaying, on the display screen, wherein the plurality of visualizations are arranged as four different mosaics in which each respective visualization is arranged with respect to other visualizations depending on the mapping of the plurality of first feature vectors onto the two-dimensional plane, each of the four different mosaics representing a different one of (i) a rate of true-positives, (ii) a rate of true-negatives, (iii) a rate of false-positives, and (iv) a rate of false-negatives of the machine learning model with respect to each group of validation images in the plurality of groups of validation images.

* * * * *